(12) United States Patent
Hindrichsen et al.

(10) Patent No.: US 11,160,294 B2
(45) Date of Patent: Nov. 2, 2021

(54) COMPOSITIONS OF HETERO- AND HOMOFERMENTATIVE LACTIC ACID BACTERIAL SPECIES FOR DUAL PURPOSE SILAGE PRESERVATION

(71) Applicant: Chr. Hansen A/S, Hoersholm (DK)

(72) Inventors: Ida Hindrichsen, Kokkedal (DK); Nina Milora, Birkeroed (DK); Christer Ohlsson, Ekeby (SE)

(73) Assignee: CHR. HANSEN A/S, Hoersholm (DK)

( * ) Notice: Subject to any disclaimer, the term of this patent is extended or adjusted under 35 U.S.C. 154(b) by 724 days.

(21) Appl. No.: 14/838,024

(22) Filed: Aug. 27, 2015

(65) Prior Publication Data

US 2016/0058034 A1    Mar. 3, 2016

Related U.S. Application Data

(60) Provisional application No. 62/156,999, filed on May 5, 2015.

(30) Foreign Application Priority Data

Aug. 28, 2014  (EP) ..................................... 14182628
Oct. 15, 2014   (EP) ..................................... 14188993
Nov. 10, 2014  (DK) ........................... PA 2014 00652

(51) Int. Cl.
*A23K 30/18* (2016.01)
*A23K 10/18* (2016.01)

(52) U.S. Cl.
CPC .............. *A23K 30/18* (2016.05); *A23K 10/18* (2016.05); *A23Y 2220/00* (2013.01); *A23Y 2220/49* (2013.01)

(58) Field of Classification Search
CPC ............ A23Y 2220/00; A23Y 2280/15; A23Y 2280/55; A23Y 2320/29; A23Y 2220/49;
(Continued)

(56) References Cited

U.S. PATENT DOCUMENTS 5,545,418 A    8/1996   Iritani et al.
5,547,692 A    8/1996   Iritani et al.
(Continued)

FOREIGN PATENT DOCUMENTS

EP    2 228 067 B1    9/2010
WO    WO-01/80663 A1    11/2001
(Continued)

OTHER PUBLICATIONS

Holzer et al., "The role of Lactobacillus buchneri in Forage Preservation". from TRENDS in Biotechnologe vol. 21, No. 6, Jun. 2003 (Year: 2003).*
(Continued)

*Primary Examiner* — Erik Kashnikow
*Assistant Examiner* — Assaf Zilbering
(74) *Attorney, Agent, or Firm* — Foley & Lardner LLP

(57) ABSTRACT

The present invention relates to a silage inoculant consisting essentially of
  a) at least one obligatory heterofermentative lactic acid bacterial species or strain and
  b) at least one homofermentative bacterial species or strain which
    (i) does not reduce growth of a), and
    (ii) reduces pH fast without producing an excess amount of lactic acid.
Further, the invention relates to a method for producing a fermented feed product, said method comprising inoculating a plant material with the silage inoculant according to the invention. It has surprisingly been found that the silage inoculant is effective even if the silage has only been incubated for a period of up to 2 or up to 4 days.

27 Claims, 10 Drawing Sheets

Figure 1A:
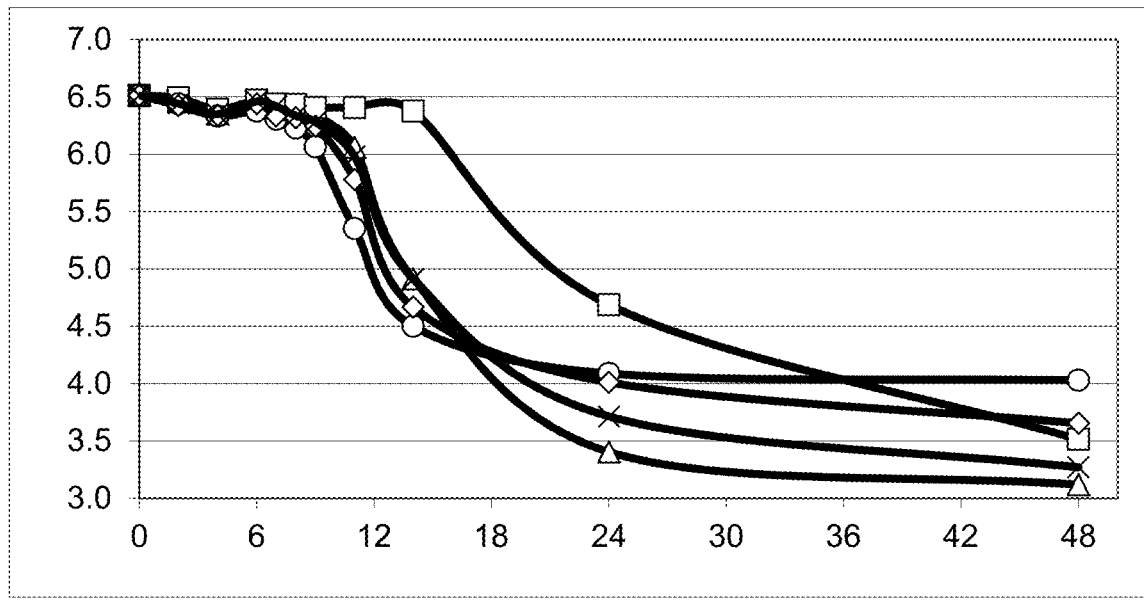

(58) Field of Classification Search
CPC ........ A23K 10/18; A23K 30/18; A23K 50/20; A23K 50/75; A23K 20/10; A23K 20/158
See application file for complete search history.

(56) References Cited

U.S. PATENT DOCUMENTS

| | | |
|---|---|---|
| 2005/0053702 A1 | 3/2005 | Elsser |
| 2010/0278796 A1 | 11/2010 | Berger |
| 2011/0142991 A1 | 6/2011 | Binder et al. |

FOREIGN PATENT DOCUMENTS

| | | |
|---|---|---|
| WO | WO-02/39825 A2 | 5/2002 |
| WO | WO-2007/031186 A1 | 3/2007 |
| WO | WO-2008/073839 A2 | 6/2008 |
| WO | WO-2008/073841 A2 | 6/2008 |
| WO | WO-2014/170233 A2 | 10/2014 |

OTHER PUBLICATIONS

Contreras-Govea et al., "Microbial Inoculants for Silage". Focus on Forage—vol. 8: No. 4. (Year: 2006).*
Jones et al., "Nisin and The Market for Commercial Bacteriocins". Available online at http://ageconsearch.umn.edu/bitstream/90779/2/ (Year: 2005).*
Muck et al., "Silage review: Recent advances and future uses of silage additives". J. Dairy Sci. 101:3980-4000. (Year: 2018).*
Danish Search Report dated Jun. 10, 2015 which issued in Danish Application No. PA 2014 00652.
European Search Report dated Feb. 27, 2015 issued in European Application No. 14 18 2628.
International-Type Search Report dated Mar. 19, 2015 issued in Danish Application No. PA 2014 00652.
Jaakkola et al., "Aerobic stability and fermentation quality of round bale silage treated with inoculants or propionic acid", Grassland in a Changing World, Proc. $23^{rd}$ General Mtg. Eur. Grassland Fed (Kiel Germany), pp. 503-505, Aug. 2010.
Jatkauskas and Vrotniakiene, "Evaluation of fermentation parameters, microbiological composition and aerobic stability of grass and whole crop maize silages treated with microbial inoculants", Zemdirbyste-Agriculture, vol. 100, No. 2, pp. 143-150, Jun. 2013.
Jatkauskas and Vrotniakiene, "The effect of silage inoculants on the fermentation and aerobic stability of legume-grass silage", Zemdirbyste-Agriculture, vol. 98, No. 4, pp. 367-374, 2011.
Jatkauskas et al., "The effects of three silage inoculants on aerobic stability in grass, clover-grass, lucerne and maize silages", Agriculture and Food Science, vol. 22, No. 1, pp. 137-144, 2013.
Nkosi et al., "Effects of bacterial silage inoculants on whole-crop maize silage fermentation and silage digestability in rams", South African Journal of Animal Science, vol. 41, No. 4, pp. 350-358, 2011.
Vandamme, B. et al, "Polyphasic Taxonomy, a Consensus Approach to Bacterial Systematics", Microbiological Reviews, Jun. 1996, vol. 60, No. 2, 407-438.
Zahiroddini et al., "Effects of Microbial Inoculants on the Fermentation, Nutrient Retention, and Aerobic Stability of Barley Silage", Asian-Aust. J. Anim. Sci., vol. 19, No. 10, pp. 1429-1436, Oct. 2006.
Hou et al., "Effects of addition of lactic acid bacteria on the quality of whole-plant corn silage," Heilongjiang Animal Science and Veterinary Medicine, 2: 50-52 (Feb. 2006).
Zhang et al., "Effects of main microorganisms in silage on the quality of silage," Feed Research 3: 65-68 (Mar. 2007).

* cited by examiner

COMPOSITIONS OF HETERO- AND HOMOFERMENTATIVE LACTIC ACID BACTERIAL SPECIES FOR DUAL PURPOSE SILAGE PRESERVATION

FIELD OF THE INVENTION

The present invention provides improved bacterial inoculant compositions useful, for example, for silage production and preservation. In specific embodiments, the compositions comprise an obligatory heterofermentative species (or strain thereof), such as a *Lactobacillus* species, and a homofermentative species (or strain thereof), such as a *Lactococcus* or *Enterococcus* species (or strain thereof). The compositions are useful in producing a fermented feed product, such as silage. Thus, the invention also provides methods comprising inoculating a plant material with the bacterial inoculant compositions described herein. In some embodiments, the inoculated material is suitable for use after a short incubation period, such as an incubation period of 2, 3, 4, 5, 6, 7, or 8 days.

BACKGROUND OF THE INVENTION

Silage is a fermented plant product that can be used to feed ruminants. Silage can be made from various plant materials that are stored under anaerobic conditions to promote anaerobic fermentation. Bacterial inoculants may be added to promote the fermentation process and/or improve the silage product. Silage is preserved by establishing anaerobic conditions and by fast pH reduction associated with organic acid production by native bacteria or inoculated lactic acid bacteria. The low pH inhibits the outgrowth of many spoilage strains which otherwise can result in loss of a great amount of nutrients.

When the silage is exposed to air, such as when the silage bunker, silo, heap or wrap is opened in order to access the silage for use, aerobic conditions can result in outgrowth of any aerobic spoilage strains present in the silage. The outgrowth of aerobic spoilage strains results in a temperature increase and high loss of nutrients.

Thus, both spoilage at the start of the fermentation process and aerobic spoilage at the feedout represent sources of significant economic loss for farmers.

The first generation of bacterial silage inoculants included obligatory homofermentative (e.g. *L. acidophilius, L. salivarius*) and facultative heterofermentative (e.g. *L. plantarum*) bacterial species aimed at reducing pH rapidly to prevent outgrowth of spoilage strains naturally occurring in the plant material, like Gram negative Enterobacteraceae (e.g. *Salmonella, Escherichia coli, Yersinia pestis, Klebsiella, Shigella*) or Gram positive Clostridia (*C. tyrobutyricum, C. perfringens, C. botulinum, C. sporogenes, C. butyricum*). The prevention of the spoilage strains by fast pH reduction reduced nutrient losses and often to some extent improved aerobic stability (Jatkauskas et al. (2013), Jatkauskas and Vrotniakiene (2013)).

The second generation of bacterial silage inoculants focused on *L. buchneri*, an obligative heterofermentative species, which was found to be superior in preventing aerobic spoilage by aerobic spoilage strains at feedout, when the silage bunker/heap is exposed to air. However, a drawback of using *L. buchneri* as a bacterial silage inoculant is that it has a longer lag phase compared to other species, and in the early stage of fermentation its production of acetic acid and lactic acid does not decrease the pH fast, when compared to obligatory homofermentative or facultative heterofermentative species.

FIG. 1 from Jatkauskas and Vrotniakiene (2013) illustrates that *L. buchneri* alone (P0) is superior compared to the other tested products with regard to aerobic stability, i.e. the time it takes for aerobic spoilage strains to heat up a silage bunker when re-exposed to air. The second best product in keeping the temperature low for many hours was an obligatory heterofermentative/facultative heterofermentative/homofermentative combination product containing *L. buchneri, L. plantarum, E. faecium*, (P1), and the next best products were purely facultative heterofermentative/homofermentative products containing *L. plantarum, E. faecium, L. lactis* with sodium benzoate (P2a) or without (P2b), a facultative heterofermentative/homofermentative product containing *L. plantarum, E. faecium, L. lactis*, (P3), and a facultative heterofermentative product containing two strains of *L. plantarum*, (P4). (Silage which was not inoculated had the lowest aerobic stability.)

Thus, there remains a need for improved bacterial silage inoculant compositions.

SUMMARY OF THE INVENTION

Provided are improved bacterial inoculant compositions useful, for example, for silage production and preservation. Also provided are methods comprising inoculating a plant material with the bacterial inoculant compositions described herein.

In some embodiments, there are provided silage inoculants consisting essentially of (a) at least one obligatory heterofermentative lactic acid bacterial species (or strain thereof) and (b) at least one homofermentative bacterial species (or strain thereof) which (i) does not reduce growth of the at least one obligatory heterofermentative lactic acid bacterial species or strain (a), and (ii) reduces pH fast without producing an excess amount of lactic acid. In some embodiments, at least one of the obligatory heterofermentative lactic acid bacterial species (or strain thereof) is a *Leuconostoc* or a *Lactobacillus* species selected from the group consisting of *Lactobacillus brevis, Lactobacillus buchneri, Lactobacillus fermentum*, and *Lactobacillus reuteri* (or strain thereof). In some embodiments, the obligatory heterofermentative lactic acid bacterial species (or strain thereof) is the *Lactobacillus buchneri* deposited as DSM 22501. In some embodiments, at least one of the homofermentative bacterial species or strains is an *Enterococcus*, e.g. an *Enterococcus faecium*. In some embodiments, at least one of the homofermentative bacterial species or strains is a *Lactococcus*, such as a *Lactococcus lactis*, such as the strain deposited as DSM 11037. In specific embodiments, the silage inoculants consist essentially of a *Lactobacillus buchneri* and a *Lactococcus*.

In some embodiments, there are provided methods for producing a fermented feed product, comprising inoculating a plant material with a silage inoculant as described herein. In some embodiments, the plant material is incubated with the silage inoculant for a period of up to 2 days, or up to 4 days, or up to 7 days, or up to or 8 days, or up to 14 days, or up to 28 days, or at least 90 days.

DETAILED DISCLOSURE OF THE INVENTION

As noted above, the present invention provides improved bacterial inoculant compositions useful, for example, for silage production and preservation. In specific embodiments, the compositions comprise an obligatory heterofermentative species (or strain thereof), such as a *Lactobacillus* species, and a homofermentative species (or strain thereof), such as a *Lactococcus* or *Enterococcus* species. The compositions are useful in producing a fermented feed product, such as silage. Thus, also provided are methods comprising inoculating a plant material with the bacterial inoculant compositions described herein. In some embodiments, the inoculated material is suitable for use after a short incubation period.

Definitions

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All steps of methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Lactic acid bacteria include genera like *Lactococcus* spp., *Enterococcus* spp., *Oenococcus* spp., *Pediococcus* spp., *Streptococcus* spp., *Leuconostoc* spp. and *Lactobacillus* spp. They can be divided into three sub-groups: obligatory heterofermentative, facultative heterofermentative and homofermentative. Lactic acid bacteria of the genus *Lactobacillus* can be either facultative heterofermentative or homofermentative depending on the species (Vandamme et al., 1996).

Obligatory heterofermentative lactic acid bacteria ferment hexoses to lactic acid, acetic acid, ethanol and carbon dioxide by the phospho-gluconate pathway. Examples of obligatory heterofermentative lactic acid bacterial species are *Leuconostoc* and *Lactobacillus* such as *Lactobacillus brevis, Lactobacillus buchneri, Lactobacillus fermentum, Lactobacillus reuteri*.

Facultative heterofermentative lactic acid bacteria additionally can ferment pentoses to lactic acid, acetic acid, formic acid and ethanol, when glucose is limited. Examples of facultative heterofermentative lactic acid bacteria are *Pediococcus* spp., *Lactobacillus casei, Lactobacillus curvatus, Lactobacillus plantarum, Lactobacillus sakei*.

Homofermentative lactic acid bacteria are defined as bacteria that degrade mainly hexoses by the Embden-Meyerhof pathway to lactic acid. Examples of homofermentative lactic acid bacteria are *Lactococcus* spp., *Enterococcus* spp. and *Lactobacillus* such as *Lactobacillus acidophilus, Lactobacillus delbrueckii, Lactobacillus helveticus, Lactobacillus salivarius*.

Many products on the market combine high lactic acid producing facultative heterofermentative/homofermentative strains with *L. buchneri*. However, the present inventors have found that this combination of bacteria does not achieve the best possible aerobic stability (i.e., does not promote maintenance of ambient temperature at feed out). While not wanting to be bound by theory, the inventors believe that this combination of bacteria reduces the growth of *L. buchneri* and/or produces high amounts of lactic acid which can be utilized by aerobic spoilage strains, thereby starting silage deterioration upon exposure to air. In accordance with some embodiments, the inoculants described herein address this problem by combining an obligatory heterofermentative species (e.g., *L. buchneri*) with bacterial species that reduce pH fast without producing an excess amount of lactic acid (e.g., *Lactococcus* and *Enterococcus*). Such selected homofermentative species do not counteract the positive effect of the obligatory heterofermentative species, or at least only do so to a much lesser extent.

Thus, in some embodiments, the present invention provides a silage inoculant consisting essentially of at least one obligatory heterofermentative lactic acid bacterial species and at least one homofermentative bacterial species which preferably does not reduce growth of the obligatory heterofermentative lactic acid bacterial species and which preferably reduces pH fast without producing an excess amount of lactic acid.

By "consisting essentially of" is meant that the silage inoculant only comprises the specified bacteria as active components and does not comprise other active component(s) such as any other bacteria, enzymes, organic acids, sodium benzoate, sodium nitrate or hexamine. An inoculant as described herein that consists essentially of specified bacteria does not include *Lactobacillus plantarum*.

By the term "at least one" is meant that the inoculant composition may comprise one, two, three, four, five or even more different obligatory heterofermentative lactic acid bacterial species and one, two, three, four, five or even more different homofermentative bacterial species.

In specific embodiments, the homofermentative bacterial species or strain does not reduce growth of the obligatory heterofermentative lactic acid bacterial species or strain. This property can be tested by growing the homofermentative bacterial strains and obligatory heterofermentative lactic acid bacterial strains overnight in Mann-Rogosa-Sharpe (MRS) media at 37° C., streaking both the homofermentative bacterial species or strains and the obligatory heterofermentative lactic acid bacterial species or strains to be tested on the same MRS agar plate at substantially the same time, and then incubating the agar plate under anaerobic conditions at 37° C. overnight. If the growth of the obligatory heterofermentative lactic acid bacteria is inhibited by at least 5 mm, then the homofermentative species or strain tested does not have this desired property. If the silage inoculant includes more than one obligatory heterofermentative lactic acid species or strain or more than one homofermentative bacterial species or strain, all relevant combinations can be tested.

By such testing, it has been found that nisin-producing strains of the homofermentative species *Lactobacillus lactis* such as *L. lactis* NCIMB 30117 and *L. lactis* ATCC 11454 inhibited *L. buchneri* DSM 22501 whereas *L. lactis* DSM 11037 and *E. faecium* DSM 16656 which strains do not produce nisin do not inhibit *L. buchneri* DSM 22501.

While not wanting to be bound by theory, these results indicate that only nisin-producing homofermentative strains of the species *Lactobacillus lactis* inhibit the obligatory heterofermentative species or strain, and that bacteriocin-producing homofermentative species or strains which do not produce nisin do not inhibit the obligatory heterofermentative species or strain. Accordingly, the requirement that the at least one homofermentative bacterial species or strain does not reduce growth of the at least one obligatory heterofermentative lactic acid bacterial species may be met if the homofermentative bacterial species or strain does not produce nisin. Thus, in specific embodiments, the homofermentative species or strain is a bacteriocin-producing homofermentative species or strain which does not produce nisin, although direct screening as outlined above may identify other strains that exhibit this property. In specific embodiments the invention relates to a silage inoculant consisting essentially of at least one obligatory heterofermentative lactic acid bacterial species (or strain thereof) and at least one homofermentative bacterial species (or strain thereof) which (i) does not produce nisin and (ii) reduces pH fast without producing an excess amount of lactic acid.

In specific embodiments, the homofermentative bacterial species or strain reduces pH fast without producing an excess amount of lactic acid. As noted above, fast reduction in pH can inhibit spoilage in the early stages of silage production, by inhibiting the growth of spoilage microorganisms such as Clostridia, Enterobacteriaceae, yeast and molds. Spoilage microorganisms may lead to nutrient loss, growth of pathogenic microorganisms, and off flavors which makes the silage less palatable to the animals, such as ruminants, to which it is fed.

As used herein, "a species or strain which reduces pH fast without producing an excess amount of lactic acid" is defined as a species or strain which produces not more than 3 mg/ml lactic acid after 24 hours inoculation in a water bath at 30° C. of a tube containing 150,000 CFU/ml of the strain in 10 ml of a sterile silage medium produced by mixing 5 g/L Yeast extract (Oxoid L21), 5 g/L Peptone soya neutralized (Oxoid LP0044C), 0.8 g/L soluble starch (Merck 1252), 0.08 g/L Manganese(II) sulfate dihydrate (Sigma M-1114), 0.037 g/L Succinic acid (assay lab), 0.069 g/L Citric acid monohydrate and 0.14 L-Malic acid (Merck 244) in 900 mL Milli Q water until dissolved, adjusting the pH to 6.3, distributing to baby bottles and autoclaving at 121° C. for 15 minutes, and then adding 100 ml of sterile filtered sugar solution containing 56 g/L D(-) fructose (Merck 4007), 32 g/L D(+) glucose monohydrate (Merck 8342), 20 g/L D(+) xylose (Merck 8689), 20 g/L L(+) arabinose (Aldrich A9, 190-6), and 32 g/L sucrose (Merck 7651).

According to one embodiment, the silage inoculant includes at least one obligatory heterofermentative lactic acid bacterial species or strain that is of a *Leuconostoc* or a *Lactobacillus* species selected from the group consisting of *Lactobacillus brevis, Lactobacillus buchneri, Lactobacillus fermentum*, and *Lactobacillus reuteri*. In a specific embodiment, the obligatory heterofermentative lactic acid bacterial species or strain is a *Lactobacillus buchneri*. Examples of *Lactobacillus buchneri* which are contemplated to be useful in the present invention are *L. buchneri* KKP 0.907, *L. buchneri* DSM 22963, *L. buchneri* NCIMB 40788, *L. buchneri* NCIMB 30139, *L. buchneri* DSM 16774, *L. buchneri* DSM 22963, *L. buchneri* DSM 12856. In specific embodiments, the *Lactobacillus buchneri* is the strain *Lactobacillus buchneri* deposited as DSM 22501.

In some embodiments the silage inoculant includes at least one bacterial species or strain which reduces pH fast without producing an excess amount of lactic acid that is an *Enterococcus* such as an *Enterococcus faecium*. Examples of Enterococci which are contemplated to be useful in the present invention are *E. faecium* NCIMB 10415, *E. faecium* CNCM 1-3236, *E. faecium* BIO 34 and *E. faecium* DSM 16573.

In other embodiments, the silage inoculant includes at least one bacterial species or strain which reduces pH fast without producing an excess amount of lactic acid that is a *Lactococcus* such as a *Lactococcus lactis*. In specific embodiments, the *Lactococcus lactis* is the strain deposited as DSM 11037.

Thus, in some embodiments, the silage inoculant consists essentially of a *Lactobacillus buchneri* strain and an *Enterococcus* strain which does not reduce growth of the obligatory heterofermentative lactic acid bacterial species (or strain) and which reduces pH fast without producing an excess amount of lactic acid. In other embodiments, the silage inoculant consists essentially of a *Lactobacillus buchneri* strain and a *Lactococcus* strain which does not reduce growth of the obligatory heterofermentative lactic acid bacterial species (or strain) and which reduces pH fast without producing an excess amount of lactic acid.

The present invention also provides methods for producing a fermented feed product, such as silage, comprising inoculating a plant material with a bacterial silage inoculant as described herein. It has surprisingly been found that the silage inoculants described herein are able to provide a very fast effect. That is, material inoculated with a bacterial silage inoculant as described may suitable for use after a short incubation period, such as an incubation period of only 2, 3, 4, 5, 6, 7, or 8 days. Thus, in some embodiments, the method comprises incubating the plant material with a silage inoculant as described herein for a period of up to 2 days, or up to 4 days, before exposing the silage to air, such as by opening the silage bunker. However, the plant material may also be incubated for a longer period such as up to 7 days, up to 8 days, up to 14 days or up to 28 days or even longer, such as a period of at least 60 days or at least 90 days, the latter being the conventional period for testing effect of silage inoculants.

As noted above, in specific embodiments, the bacterial silage inoculants described herein can achieve a fast pH reduction at the start of the silage process, while maintaining high aerobic stability at feedout. That is, the bacterial silage inoculants described herein may exhibit a fast initial fermentation that reduces dry matter (DM) loss and spoilage in the early phase of fermentation and also may achieve an aerobic stability which is the same as or comparable to inoculation with an obligatory heterofermentative strain such as *L. buchneri* alone. Thus, the inoculants described herein achieve better aerobic stability than products containing homofermentative or/and facultative heterofermentative strains only, although their aerobic stability may not be as good as that achieved with the obligatory heterofermentative *L. buchneri* alone.

Deposited Strains

A *Lactobacillus plantarum* strain has been deposited at DSMZ (Deutsche Sammlung von Mikroorganismen und Zellkulturen GmbH, Inhoffenstrasse 7B, D-38124 Braunschweig) under the accession number DSM 16568 with a deposit date of Jul. 13, 2004 by Chr. Hansen A/S, Denmark. The deposit has been made under the conditions of the Budapest Treaty on the International Recognition of the Deposit of Microorganisms for the Purposes of Patent Procedure.

A *Lactobacillus buchneri* strain has been deposited at DSMZ (Deutsche Sammlung von Mikroorganismen und Zellkulturen GmbH, Inhoffenstrasse 7B, D-38124 Braunschweig) under the accession number DSM 22501 with a deposit date of Apr. 22, 2009 by Chr. Hansen A/S, Denmark. The deposit has been made under the conditions of the Budapest Treaty on the International Recognition of the Deposit of Microorganisms for the Purposes of Patent Procedure.

An *Enterococcus faecium* strain has been deposited at DSMZ (Deutsche Sammlung von Mikroorganismen und Zellkulturen GmbH, Inhoffenstrasse 7B, D-38124 Braunschweig) under the accession number DSM 22502 with a deposit date of Apr. 22, 2009 by Chr. Hansen A/S, Denmark. The deposit has been made under the conditions of the Budapest Treaty on the International Recognition of the Deposit of Microorganisms for the Purposes of Patent Procedure.

For the above-identified deposited microorganisms, the following additional indications apply: As regards the respective Patent Offices of the respective designated states, the applicants request that a sample of the deposited microorganisms stated above only be made available to an expert nominated by the requester until the date on which the patent is granted or the date on which the application has been refused or withdrawn or is deemed to be withdrawn.

The *Lactobacillus lactis* strain DSM 11037 has been deposited with DSMZ (Deutsche Sammlung von Mikroorganismen und Zellkulturen GmbH, Inhoffenstrasse 7B, D-38124 Braunschweig) on Jun. 26, 1996 by Chr. Hansen A/S, Denmark and is referred to in granted patent EP 928333.

Embodiments of the present invention are described below, by way of non-limiting examples.

LEGEND TO FIGURES

FIG. 1a pH reduction over 48 h of sterile silage medium inoculated with Composition 1 (Δ), Composition 2 (□), Composition 3 (○), Composition 4 (◇) and Composition 5 (X). Start inoculation was 150,000 CFU/ml and the temperature was kept at 30° C., n=1.

FIG. 1b

Lactic acid concentration in mg/ml over 48 h of sterile silage medium inoculated with Composition 1 (Δ), Composition 2 (□), Composition 3 (○), Composition 4 (◇) and Composition 5 (X). Start inoculation was 150,000 CFU/ml and the temperature was kept at 30° C., n=1.

FIG. 1c

Acetic acid concentration in mg/ml over 48 h of sterile silage medium inoculated with Composition 1 (Δ), Composition 2 (□), Composition 3 (○), Composition 4 (◇) and Composition 5 (X). Start inoculation was 150,000 CFU/ml and the temperature was kept at 30° C.

FIG. 2 pH reduction over 72 h of sterile ensilage medium inoculated with Composition 2 (□), Composition 4 (◇) and Composition 6 (▭). Start inoculation was 150,000 CFU/ml and the temperature was kept at 30° C.

FIG. 3

Acetic acid/lactic acid proportion of maize harvested 2011 in Denmark (mini-silo 1) and either not inoculated (white bars), inoculated with Composition 4 (grey bars) or Composition 7 (black bars). The mini silo vacuum bags were stored at 25° C. until opening after 7, 28, 61 and 88 days.

FIG. 4

Aerobic stability of maize harvested 2012 in Denmark (mini-silo 2) and either not inoculated (■), inoculated with Composition 4 (◇) or Composition 5 (X). On the x-axis is time (h) and on the y-axis is temperature (° C.). Dashed black line shows ambient temperature, while the dashed grey line is the ambient temperature+3° C.

FIG. 5 pH of mini silo with maize silage harvested 2012 (mini-silo2) after seven days of aerobic challenge incl. SEM of four observations. Either not inoculated (white bar), inoculated with Composition 4 (grey bar) or Composition 5 (dotted bar).

FIG. 6

Aerobic stability of maize harvested 2013 in Denmark (mini-silo 3) and either not inoculated (■), inoculated with Composition 2 (□) or Composition 4 (◇) On the x-axis is time (h) and on the y-axis is temperature (° C.). Dashed black line shows ambient temperature, while the dashed grey line is the ambient temperature+3° C.

FIG. 7

Aerobic stability of red maize forage harvested 2013 (mini-silo 4) and either not inoculated (■), inoculated with Composition 2 (□), Composition 4 (◇) and Composition 7 (△). On the x-axis is time (h) and on the y-axis is temperature (° C.). Dashed black line shows ambient temperature, while the dashed grey line is the ambient temperature+3° C.

FIG. 8

Aerobic stability of red clover:timothy:fescue forage harvested 2013 (mini-silo 5) and either not inoculated (■), inoculated with Composition 2 (□), Composition 4 (◇), Composition 7 (△). On the x-axis is time (h) and on the y-axis is temperature (° C.). Dashed black line shows ambient temperature, while the dashed grey line is the ambient temperature+3° C.

FIG. 9a

Aerobic stability (hours) in maize silage (mini-silo 6a) after 7 and 14 days of fermentation followed by 7 days aerobic challenge (7+7 and 14+7, respectively) and either not inoculated (white), inoculated with Composition 4 (grey) or Composition 7 (black).

FIG. 9b

Aerobic stability (hours) in maize silage (mini-silo 6b) after 2, 4, and 8 days of fermentation followed by 7 days aerobic challenge (2+7, 4+7, and 8+7, respectively) and either not inoculated (white) or inoculated with Composition 4 (grey).

FIG. 10

Number of yeasts (cfu/g) in maize silage (mini-silo 6a) after 2, 7, and 14 days of fermentation and either not inoculated (white), inoculated with Composition 4 (grey) or Composition 7 (black).

FIG. 11 pH development of maize silage (mini-silo 6a) after 2, 7, and 14 days of fermentation either not inoculated (white), inoculated with Composition 4 (grey) or Composition 7 (black).

FIG. 12

Accumulated gas production over 162 hours of maize harvested in 2014 (mini-silo 7a) and either not inoculated (grey squares) or inoculated with Composition 4 (black circles). On the x-axis is time (h) and on the y-axis is volume in ml/g fresh forage.

FIG. 13

Difference in gas production between control and maize inoculated with Composition 4 (mini-silo 7b). On the x-axis is time (h) and on the y-axis is difference in volume in ml/g fresh forage.

FIG. 14

Percentage weight loss of vacuum packed maize harvested in 2014 after 162 hours (mini-silo 7b) and either not inoculated (white) or inoculated with Composition 4 (grey) or Composition 7 (black).

FIG. 15

Difference in gas development in vacuum packed maize harvested in 2014 after 6 days of fermentation. Vacuum-packed bags of forage with either no inoculation (left hand side of photograph) or Composition 4 (150,000 CFU/g maize, right hand side of photograph).

EXAMPLES

Example 1

Sterile In Vitro Batch Cultures

Single strains of homofermentative and heterofermentative lactic acid bacteria and combination products were tested in two independent experimental setups using a sterile silage medium containing various different carbohydrate sources to simulate the carbohydrate composition of grass. The pH and organic acid content were measured over time. The medium contained 5 g/L Yeast extract (Oxoid L21), 5 g/L Peptone soya neutralized (Oxoid LP0044C), 0.8 g/L soluble starch (Merck 1252), 0.08 g/L Manganese(II) sulfate dihydrate (Sigma M-1114), 0.037 g/L Succinic acid (assay lab), 0.069 g/L Citric acid monohydrate and 0.14 L-Malic acid (Merck 244) which was mixed in 900 mL Milli Q water until dissolved. The pH was adjusted to 6.3 and distributed to baby bottles and autoclaved at 121° C. for 15 minutes. After autoclaving 100 ml of sterile filtered sugar solution containing 56 g/L D(−) fructose (Merck 4007), 32 g/L D(+) glucose monohydrate (Merck 8342), 20 g/L D(+) xylose (Merck 8689), 20 g/L L(+) arabinose (Aldrich A9, 190-6) and 32 g/L Sucrose (Merck 7651) was added to obtain the final silage medium. In both Experiments 1 and 2 the sterile silage medium was used and inoculated with the various different inoculant compositions outlined in Table 1.

TABLE 1

Strain compositions used in the two in vitro batch culture studies

| Composition no. | Experiment | Bacterial strains | Percentage | CFU/ml |
|---|---|---|---|---|
| 1 | 1 | L. plantarum DSM 16568 | 100 | 150,000 |
| 2 | 1, 2 | L. buchneri DSM 22501 | 100 | 150,000 |
| 3 | 1 | L. lactis DSM 11037 | 100 | 150,000 |
| 4 | 1, 2 | L. buchneri DSM 22501 | 50 | 150,000 |
|   |   | L. lactis DSM 11037 | 50 |   |
| 5 | 1 | L. buchneri DSM 22501 | 70 | 150,000 |
|   |   | L. lactis DSM 11037 | 20 |   |
|   |   | L. plantarum DSM 16568 | 10 |   |
| 6 | 2 | L. buchneri DSM 22501 | 50 | 150,000 |
|   |   | L. plantarum DSM 16568 | 50 |   |

Experiment 1

10 ml of the silage medium inoculated with the various inoculant compositions in Table 1 was distributed into each of eleven sterile tubes and kept in a water bath at 30° C. After 0, 2, 4, 6, 7, 8, 9, 11, 14, 24 and 48 hours samples were taken for volatile organic acid (VFA) and lactic acid analysis and pH. The pH was monitored using a handheld pH-meter, while volatile organic acids were analyzed on HPLC (Dionex).

Experiment 2

Experiment 2 was similar to Experiment 1 with regard to sterile silage medium, inoculation level and temperature. Compositions 2, 4 and 6 were used as the inoculants. An automatic pH-meter was used and acetic acid, lactic acid and formic acid were measured on a HPLC (Dionex) after 72 h.

Results

Figure 2:
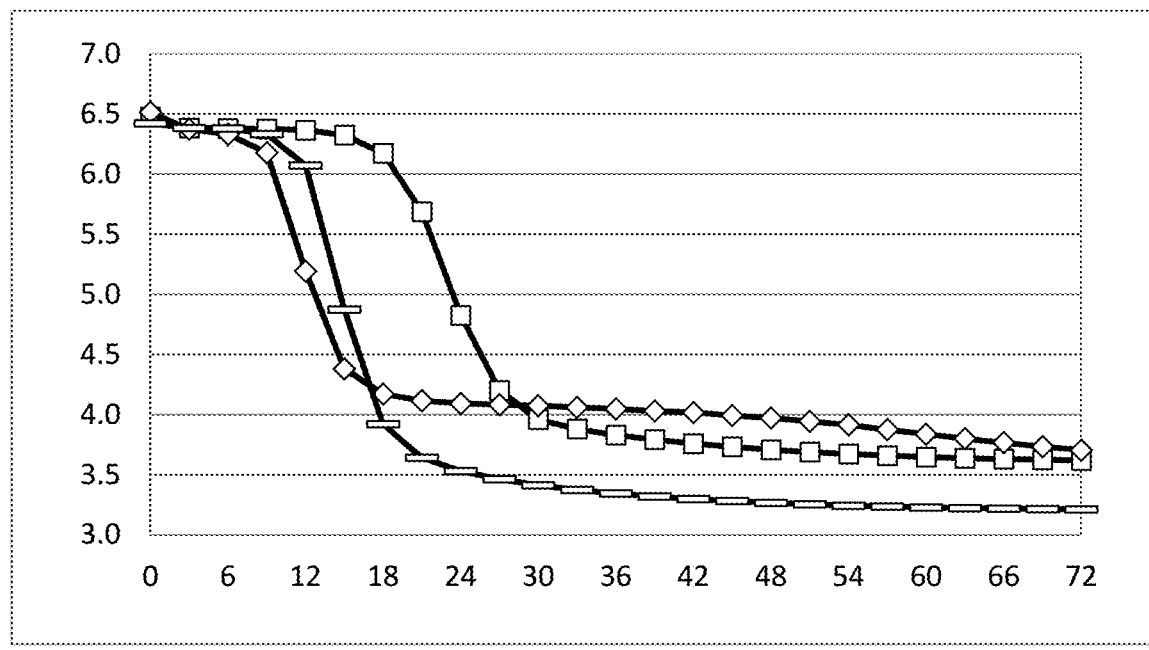

The results of Experiments 1 and 2 showing the effects of the various inoculant compositions on pH and organic acid content are provided in FIGS. 1a, b, c and FIG. 2, as well as in Table 2.

FIG. 1a shows the change in pH over time from Experiment 1. Composition 2 reduced pH very slowly. Composition 1 and Composition 3 reduce the pH much faster and after 14 hours the pH was below 5.0 while Composition 2 still had a pH above 6.0. Composition 4 reduced the pH as quickly as Composition 3. Composition 5 resulted in a pH curve very similar to Composition 1.

Figure 1B:
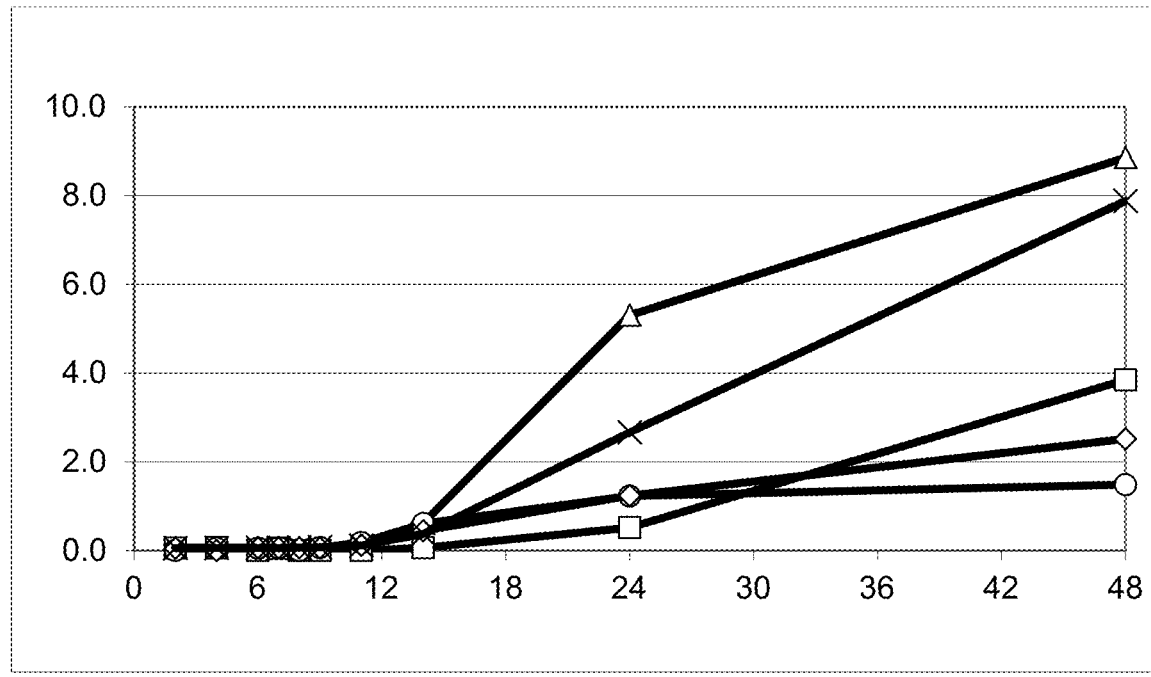

FIG. 1b shows the lactic acid concentration over time from Experiment 1. After 24 hours Composition 1 produced much more lactic acid compared to Composition 2, Composition 3 or Composition 4. After 48 hours the lactic acid concentration of Composition 1 was more than 8 mg/ml as opposed to 4 mg/ml or lower with Composition 2, Composition 3 or Composition 4. Composition 5 resulted in a lactic acid concentration very similar to Composition 1.

Figure 1C:
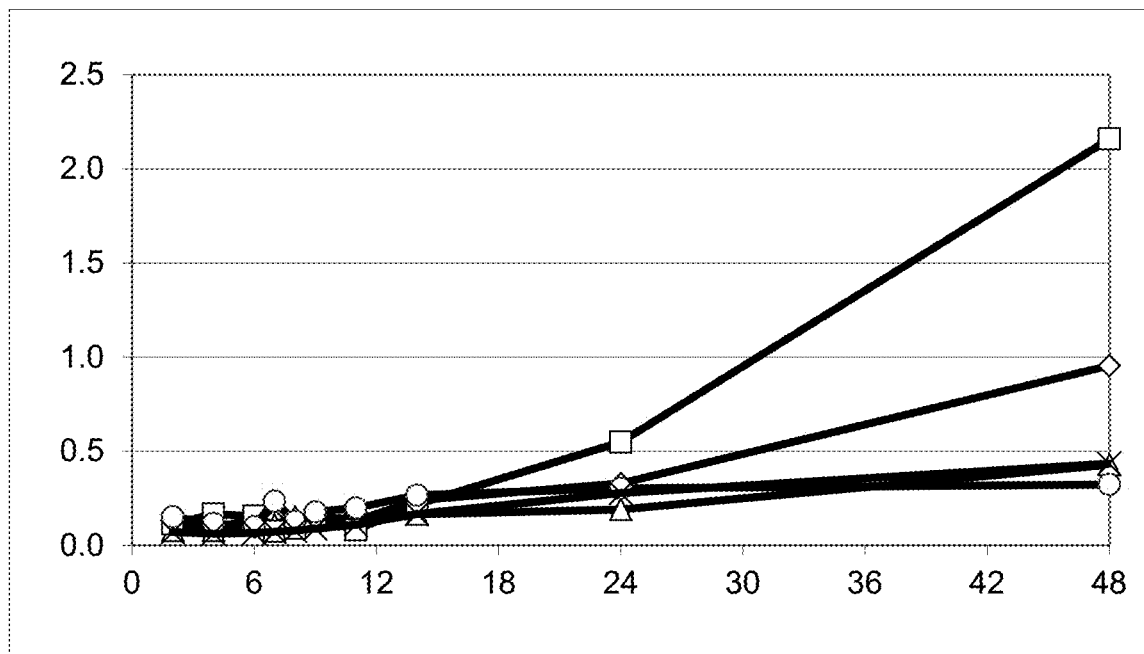

FIG. 1c shows the acetic acid concentration over time from Experiment 1. After 48 hours Composition 2 had an acetic acid concentration of over 2 mg/ml, while Composition 1 and Composition 3 produced less than 0.5 mg/ml acetic acid. Composition 4 produced 1 mg/ml of acetic acid after 48 hours, while Composition 5 resulted in a concentration of less than 0.5 mg/ml.

FIG. 2 shows the change in pH over time from Experiment 2. Again Composition 2 reduced pH very slowly. Composition 4 reduced the pH much faster and after 15 hours the pH was below 4.5, while Composition 6 still had a pH of above 6.0. Composition 6 resulted in a slightly slower pH drop compared to Composition 4. However, the pH reduction continued rapidly and the pH was below 4.0 already after 18 hours. After 72 hours the pH of Composition 2 and Composition 4 reached 3.6 and 3.7, respectively, while Composition 6 went as low as 3.2.

TABLE 2

Organic acid production of inoculated sterile silage medium after 72 hours (Experiment 2)

| Composition no. | Bacterial strains | % | Formic acid (mg/ml) | Acetic acid (mg/ml) | Lactic acid (mg/ml) |
|---|---|---|---|---|---|
| 2 | L. buchneri DSM 22501 | 100 | 0.012 | 2.895 | 4.077 |
| 4 | L. buchneri DSM 22501 | 50 | 0.447 | 1.760 | 3.488 |
|   | L. lactis DSM 11037 | 50 |   |   |   |
| 6 | L. buchneri DSM 22501 | 50 | 0.014 | 0.554 | 10.777 |
|   | L. plantarum DSM 16568 | 50 |   |   |   |

Table 2 shows that acetic acid production was strongly reduced with Composition 6, which contains L. buchneri DSM 22501 and L. plantarum DSM 16568 in contrast to Composition 4, which contains L. buchneri DSM 22501 and L. lactis DSM 11037. Composition 6 also showed a high lactic acid concentration after 72 hours. Composition 4 not only had a much higher acetic acid concentration compared to Composition 6, but it also had a high concentration of formic acid.

Example 2

Aerobic Stability in Mini-Silos

Mino-Silos 1, 2, and 3—Maize Harvest 2011, 2012, and 2013, Denmark

Five different mini-silo experiments were set up to test various different silage inoculant compositions. Three experiments were set up in Denmark with maize harvested from three different farms in 2011 (Mini-silo 1), 2012 (Mini-silo 2) and 2013 (Mini-silo 3) and two experiments were conducted in Lithuania in 2013 using maize and red clover:timothy:fescue sward (60:30:10) (Mini-silos 4 and 5). An overview of the inoculants used and the application rates are listed in Table 3.

TABLE 3

Strain compositions used in the mini-silo studies

| Composition No. | Mini silo No. | Forage | Bacterial strains | Percentage | CFU/g forage |
|---|---|---|---|---|---|
| No additive | 1, 2, 3, 4, 6, 7a, 7b | Maize | | 0 | |
| | 5 | Grass/Clover | | | |
| 2 | 3, 4 | Maize | *L. buchneri* DSM 22501 | 100 | 150,000 |
| | 5 | Grass/Clover | | | |
| 4 | 1, 2, 3, 4, 6, 7a, 7b | Maize | *L. buchneri* DSM 22501 | 50 | 150,000 |
| | 5 | Grass/Clover | *L. lactis* DSM 11037 | 50 | |
| 5 | 2 | Maize | *L. buchneri* DSM 22501 | 70 | 150,000 |
| | | | *L. lactis* DSM 11037 | 20 | |
| | | | *L. plantarum* DSM 16568 | 10 | |
| 7 | 1, 4 | Maize | *L. buchneri* DSM 22501 | 50 | 150,000 |
| | | | *E. faecium* DSM 22502 | 30 | |
| | 5, 6 | Grass/Clover | *L. plantarum* DSM 16568 | 20 | |

For mini-silo 1 the maize was harvested in South-West Jutland. Transport time to the laboratory was 4 hours. Afterwards, the maize was stored overnight outside before being frozen at −20° C. At the time of inoculation the maize was thawed for 1-2 hours and then kept in a refrigerator at 4-5° C. Inoculants were suspended in tap water and filled into spray flasks. The targeted dosage for each treatment was 150,000 CFU/g maize, and the amount needed to reach the targeted inoculum dosage was calculated based on the actual potency of the compositions. 1000 g of maize was weighed into a plastic bag a little at a time so that the inoculant could be sprayed homogeneously onto the maize. The bag was then shaken to ensure equal distribution of the inoculum to the bag. The 1000 g inoculated maize was then distributed to five alubags at 200 g each for each time point (7, 28, 61 and 88 days). The vacuum packed alubags were stored at 25° C.

Five alubags per treatment were opened at the different time points. The samples were then assayed for small organic acids.

For mini-silo 2 freshly harvested maize was collected from a farm in central Zealand, Denmark, and transported to the lab straightaway. The five different treatments listed in Table 3 as well as a control group were tested in a mini-silo set up. Inoculants were suspended in tap water and filled into spray flasks. The targeted dosage for each treatment was 150,000 CFU/g maize and the amount needed to reach the targeted inoculum was calculated based on the actual potency of the products. 1000 grams of maize were weighed into a bag a little at a time so that the inoculant could be sprayed homogeneously onto the maize. After shaking the bag to ensure further distribution of the inoculum the bag was vacuum packed. Four bags of each treatment were prepared and stored at 25° C. for further analysis after three months. After three months an aerobic stability study was set up using the silage that had been stored in vacuum bags. Silage was distributed into containers (plastic bottles open on top with a hole in the bottom) with a temperature sensor located in the middle, placed in a polystyrene hollow, covered with a large plastic plate, and stored at room temperature. The temperature of each individual sample after exposure to air was monitored over a period of 7 days.

For mini-silo 3 freshly harvested maize was collected from a farm in north-east Zealand. The procedure was the same as described for mini-silo 2, except that the aerobic stability study was conducted after only two weeks.

Results of Mini-Silos 1, 2 and 3

Figure 3:
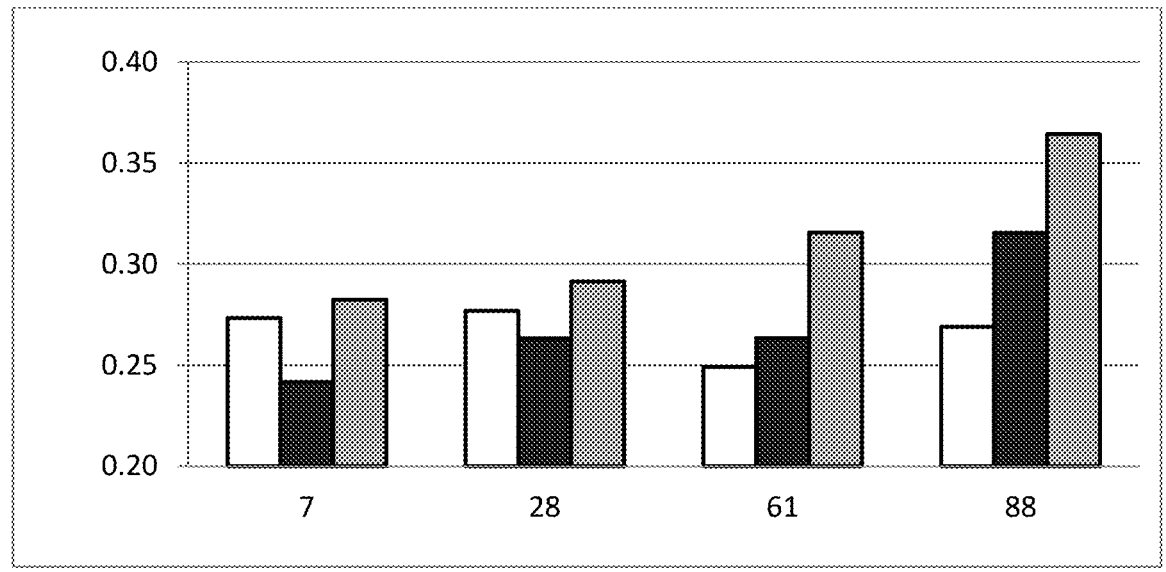

The ratios of acetic acid to lactic acid in the silage of mini-silo 1 at different time points are shown in FIG. 3. The proportion of acetic acid to lactic acid is higher in the not inoculated control compared to Composition 7 after seven days and after 28 days. However, after 88 days Composition 7 has a high acetic acid to lactic acid ratio as compared to control. Composition 4 has a high acetic acid to lactic acid ratio from day seven which increases over time. The average pH of all samples was below 4.0 at all time points.

Figure 4:
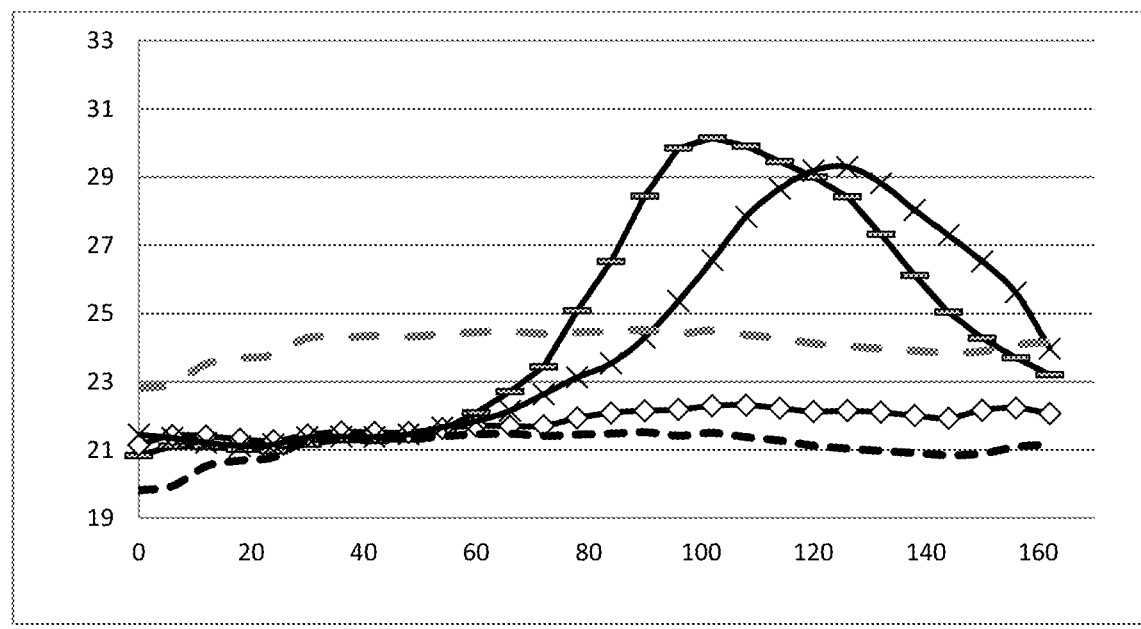
Figure 5:
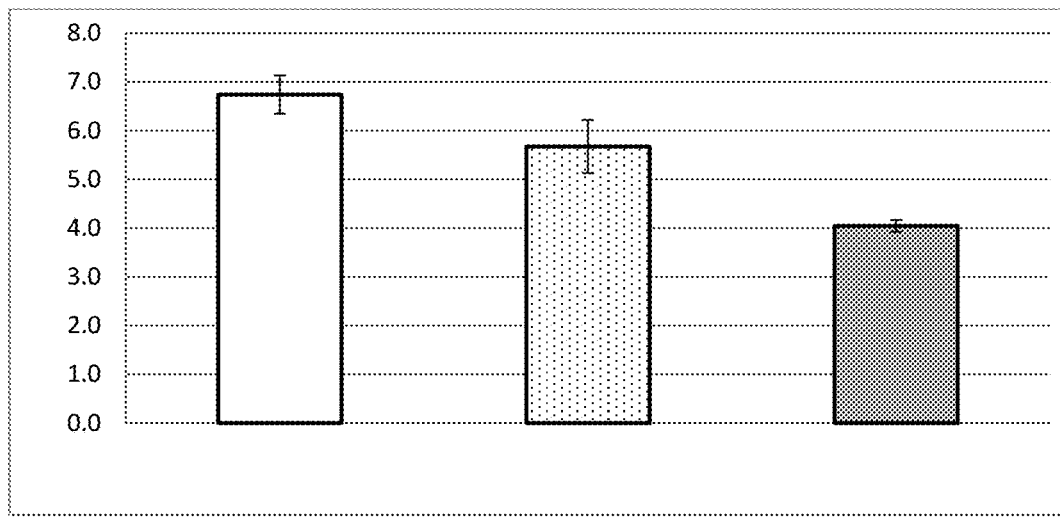

The results of mini-silo 2 are shown in FIG. 4. It can be seen that the temperature of the non-inoculated control silage was more than 3° C. above the ambient temperature after 78 hours, while Composition 5 rose above 3° C. of the ambient temperature after 96 hours. Composition 4 kept the maize silage stable during all 162 hours of measurement. As shown in FIG. 5, after 162 hours, the pH of the control was on average at 6.74, while silage treated with Composition 5 had an average pH of 5.67 and Composition 4 had an average pH of 4.05.

Figure 6:
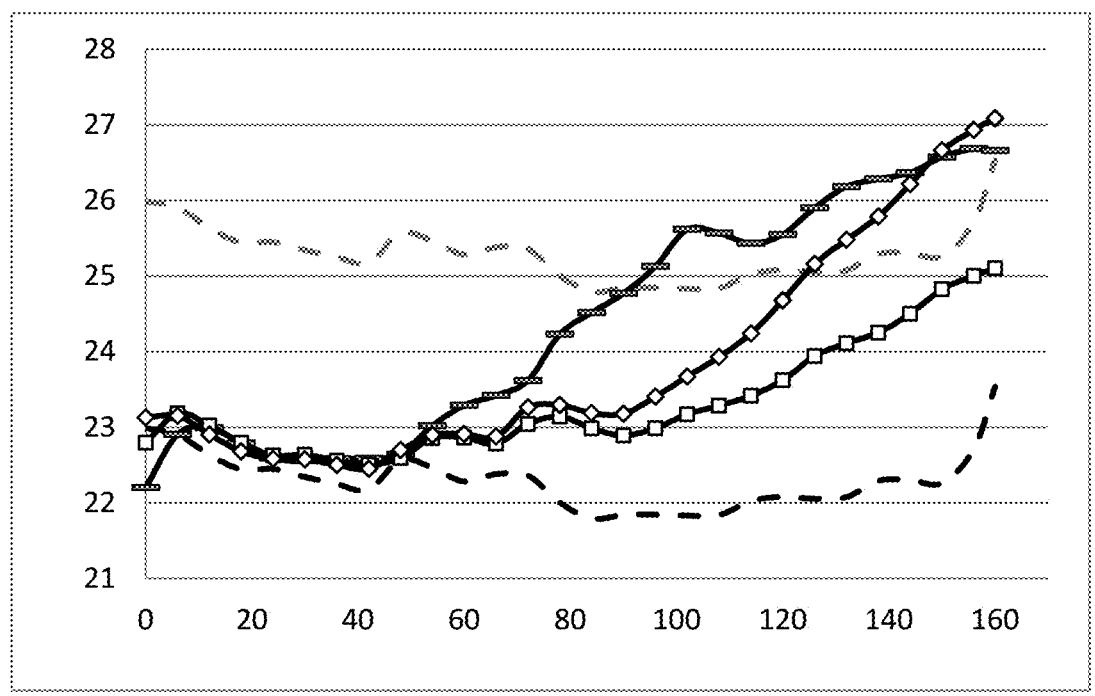

For mini-silo 3, the vacuum-packed silage opened after storage which was not inoculated was unstable after 93 hours, while the silage inoculated with Composition 2 was stable for the whole period of 160 hours and the silage inoculated with Composition 4 was stable for 129 hours (FIG. 6).

Mino-Silos 4 and 5—Maize and Grass/Clover Harvest 2013, Lithuania

For mini-silo 4, maize (*Zea mays L.*) was harvested in the dough stage of the grain maturation. The dry matter (DM) concentration of the maize was 38.85% and the water soluble carbohydrate concentration was 2.54%. Maize was chopped by a forage harvester under farm conditions to pieces of about 2 cm in length.

For mini-silo 5, a grass clover mixture containing 60% red clover, 30% timothy and 10% fescue sward was harvested and dried to a dry matter of 32.8%. This forage mixture is referred to as grass/clover mixture. The water soluble carbohydrate content was 20.3 g/kg DM (2.03% fresh forage). The grass/clover mixture was chopped by a forage harvester under farm conditions to pieces of 2-3 cm in length.

Both for mini-silo 4 and mini-silo 5, five representative samples (>500 g each) were taken for nutritional value analysis of both forages and treatment. The forages were transported in a polyethylene bag to the laboratory. Laboratory experiments started within 0.5 h from crop preparation. A 500 g representative sample of wilted and chopped herbage was taken for nutritional value, buffer capacity, nitrate and microbial composition analyses. The same silage inoculants and procedure were used in the maize and the grass/clover forage trials.

The silage inoculant was suspended in distilled water immediately prior to its application targeting a dose as described in Table 3. Five replicates were conducted for each treatment. The application rates of the products were calculated according to the stated dose in Table 3 and the actual bacterial concentration of the products. Chlorine-free water was used when diluting the products. The same volume of distilled water was used instead of the suspension in the control treatment (for spontaneous fermentation). After inoculation 3-L glass jars were filled with 1.80-1.84 kg of the fresh crop equally to 1 kg DM per 5 liter volume. The jars were closed with caps 15 min after being filled. Gas production during fermentation was released with a gas-vent during the experiment. After 90 days of storage in the glass jars at a constant temperature of 20° C., chemical and microbial analyses were conducted.

In order to measure the aerobic stability of the silages, the temperature was monitored inside the silage for 10 days. For this, thermocouple wires were inserted in the midpoint of the silage samples which were placed in open polystyrene boxes. The top and bottom of the boxes contained a 2-cm-diameter hole to allow air to enter and $CO_2$ to leave. A transducer was placed in the center of the silage mass through a hole in the cover of the box, which exposed the silage to air. These silages were not disturbed during the period of recording the temperatures. The boxes were kept in constant room temperature ($\approx$20° C.). Ambient temperature and the temperature of each silage was recorded every 6 h by a data logger. Ambient room temperature was measured by using an empty control box. Aerobic stability of silages was examined by calculating the differences between silage temperature and ambient room temperature. Aerobic deterioration was denoted by days (or hours) until the start of a sustained increase in temperature of more than 3° C. above the ambient temperature.

TABLE 4

Analytical methods

| Quality parameters | Object | Short description or essence of method, reference |
|---|---|---|
| Dry matter (DM) | Herbage* Silage** | Oven drying at 67° C. for 24 h, equilibrated to room humidity overnight, milled through a 1 mm sieve and further dried at 105° C. to constant weight |
| Crude protein | * | Kjeldahl-AOAC 984.13. 10.5 g of catalyst is used. With |
|  | ** | Block Digestion and Tecator Kjeltec system 1002 Distiling Unit |
| Crude fat | * | Extraction by Soxtec System using petrol ether 40-600 C. |
|  | ** | Crude fat residue determined gravimetrically after drying |
| Crude fibre | * | With Fibercap (Foss Tecator) using sulphuric acid and Na |
|  | ** | hydroxide treatment |
| Acid detergent fibre (ADF) | * ** | ANKOM A200 Filter Bag Technique (FBT) |
| Neutral detergent fibre (NDF) | * ** | A200 Filter Bag Technique (FBT) |
| Water soluble carbohydrates (WSC) | * ** | Using the anthrone reaction assay (MAFF, 1986), from the herbage or silage extracts obtaining from steeping fresh herbage or silage in water |
| Crude ash | * | AOAC Method 942.05. Ca - AOAC 968.08 dry ashing, |
|  | ** | atomic Absorption Spectrophotometric Method, P - spectrophotometric Molybdovanadophosphate Method |
| Buffering capacity | * | According to Playne and McDonald (1966), expressed as mequiv of alkali required to change the pH from 4 to 6 per 100 g of dry matter |
| Nitrate | * | Herbage extracts obtaining from steeping fresh herbage in water analyzed using the nitrate ion selective electrode |
| Lactic acid | ** | On an aqueous extract from fresh silage according to |
| Acetic acid | ** | the standard methods (Naumann and Bassler, 1997) |
| Butyric acid | ** |  |
| Ammonia N | ** | Distillation - AOAC 941.04 |
| pH after 3, 90 and 97 days | ** | Silage extracts obtained from steeping fresh herbage in water analyzed using ThermoOrion Posi-pHlo SympHony |
| pH before ensiling | * | Electrode and Thermo Orion 410 meter |
| Weight loss (DM losses) | ** | Estimated by measuring differences in silo weights before and after ensiling |
| Yeast and Moulds | * ** | LST ISO 21527-2:2008 |
| Lactic acid bacteria | * | ISO 15214:1998 |
| Clostridia*** | * | ISO 7937:2004 |

*Five herbage samples for analyses were collected immediately after spraying and at the time of filling the silos
**Silages from each silo in each variants (including control) were sampled after 90 days of storage
***If more than 1500 cfu/g clostridia in the fresh forage, analysis are made of the silage for clostridia VFA and Lactic acid and lower alcohol concentrations were determined by gas-liquid chromatography on aqueous silage extracts obtained from steeping 30 g of fresh silage in 150 ml of deionized water for 16 hours at 40° C. in a sealed container followed by a preliminary filtering through 3 μm filter paper. Deionized water (3 ml) of an internal standard solution (0.5 g 3-methyl-n-valeric acid in 1000 ml 0.15 mol 1-1 oxalic acid) was added to 1 ml of filtrate from the above, and the solution filtered through a 0.45 μm polyethersulphone membrane into a chromatographic sample vial for analysis. Gas-liquid chromatograph GC-2010 SHIMADZU used wide-bore capillary column (Stabilwax®-DA 30 m, 0.53 mm, ID, 0.5 μm) according to Gas Chromatography and Biochemistry Analyzer official methods. Ammonia-Nitrogen ($NH_3N$) was determined by Distillation—AOAC 941.04.

Results of Mini-Silo 4 and 5

The results from the maize mini-silo 4 are shown in Table 5. All three inoculated maize silages had a significant (P>0.05) lower pH compared to control after 3 days of anaerobic fermentation. Composition 4 and Composition 7 had significant less DM loss (%/kg), significantly (P<0.05) less N—NH3 fraction (%/kg of total N) and a significantly (P<0.05) higher lactic acid concentration (%/kg DM) compared to Composition 2 and control. Inoculating maize with Composition 2 and Composition 4 resulted in significantly (P<0.05) higher acetic acid (%/kg DM) and propionic acid (%/kg DM) concentrations compared to Composition 7 and control. All inoculated maize silages had a lower yeast and mold count (log CFU/g) compared to control.

Figure 7:
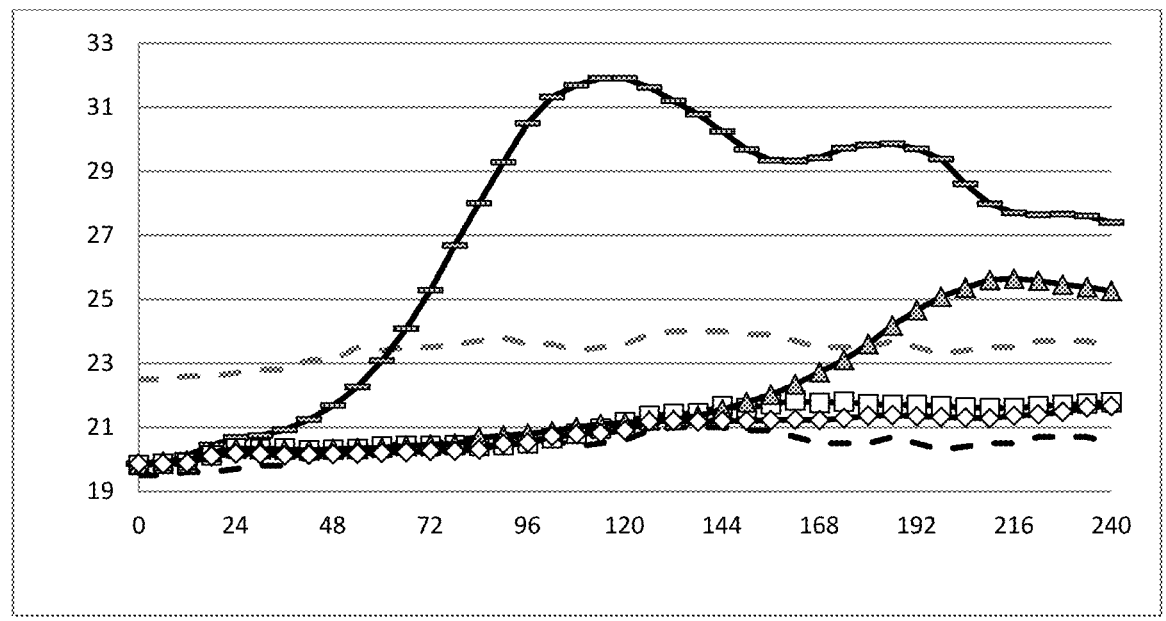

As can be seen in FIG. 7 aerobic exposure of 10 days resulted in a temperature rise greater than 3° C. above ambient temperature after 66 hours for not inoculated control silage, while Composition 7 rose to greater than 3° C. above the ambient temperature after 178 hours, which was a significantly (P<0.05) longer time compared to control and a significantly (P<0.05) shorter time compared to Compositions 2 and 4. After 240 hours of aerobic exposure, the pH of the control was as high as 8.29, while Composition 7 had a pH of 5.66, which was significantly (P<0.05) lower compared to control.

TABLE 5

Effect of various compositions on the fermentation variables and microbial composition of ensiled maize

|  | Control | Composition 2 (percentage) | Composition 4 (percentage) | Composition 7 (percentage) |
|---|---|---|---|---|
| L. buchneri DSM 22501 |  | 100 | 50 | 50 |
| L. lactis DSM 11037 |  |  | 50 |  |
| E. faecium DSM 22502 |  |  |  | 30 |
| L. plantarum DSM 16568 |  |  |  | 20 |
| Measurement after 3 days of anaerobic fermentation | | | | |
| pH after 3 days | 4.36$^a$ | 4.18$^b$ | 4.17$^b$ | 4.14$^c$ |
| Measurement after 90 days of anaerobic fermentation | | | | |
| pH after 90 days | 4.04$^a$ | 3.91$^b$ | 3.92$^b$ | 3.90$^b$ |
| DM, %/kg desiled† | 36.69$^a$ | 37.52$^b$ | 37.62$^b$ | 37.77$^b$ |
| DM loss, %/kg | 6.74$^a$ | 4.42$^b$ | 3.90$^c$ | 3.43$^c$ |
| N—NH3 fraction, %/kg total N | 5.18$^a$ | 4.38$^b$ | 3.92$^c$ | 3.83$^c$ |
| Lactic acid, %/kg DM | 2.78$^a$ | 3.01$^a$ | 3.47$^c$ | 4.06$^b$ |
| Acetic acid, %/kg DM | 1.11$^c$ | 2.83$^a$ | 2.68$^a$ | 1.72$^b$ |
| Butyric acid, %/kg DM | 0.034$^a$ | 0.008$^b$ | 0.006$^b$ | 0.004$^b$ |
| Propionic acid, %/kg DM | 0.012$^b$ | 0.028$^a$ | 0.026$^a$ | 0.012$^b$ |
| Alcohols, %/kg DM | 1.00$^a$ | 0.62$^b$ | 0.50$^c$ | 0.49$^c$ |
| Yeast (log CFU/g) | 3.93$^a$ | 1.04$^b$ | 1.26$^c$ | 1.56$^c$ |
| Moulds (log CFU/g) | 3.00$^a$ | 1.0$^b$ | 1.16$^b$ | 1.25$^c$ |
| Measurement after 10 days of aerobic exposure | | | | |
| pH after aerobic stability test | 8.29$^a$ | 4.44$^b$ | 4.39$^b$ | 5.66$^c$ |
| Aerobic stability, hours | 66.0$^b$ | 240.0$^a$ | 240.0$^a$ | 177.6$^c$ |

Different letters in a row with show statistically significant difference (P < 0.05)
There was no effluent in the silo's upon opening
†Dry matter corrected for volatiles The results from mini-silo 5 using a grass/clover mixture are shown in Table 6. All three inoculated grass/clover silages had a significantly (P>0.05) lower pH compared to control after 3 days of anaerobic fermentation. Composition 4 and Composition 7 had significantly (P<0.05) less DM loss (%/kg). While all inoculated grass/clover silage had significantly (P<0.05) less N—NH3 fraction (%/kg of total N) compared to control and significantly (P<0.05) higher lactic acid concentration (%/kg DM) than control, inoculating maize with Composition 4 resulted in a significantly (P<0.05) higher acetic acid (%/kg DM) concentration compared to Composition 7 and control. All inoculated grass/clover silages had a lower yeast and mold count (log CFU/g) compared to control.

Figure 8:
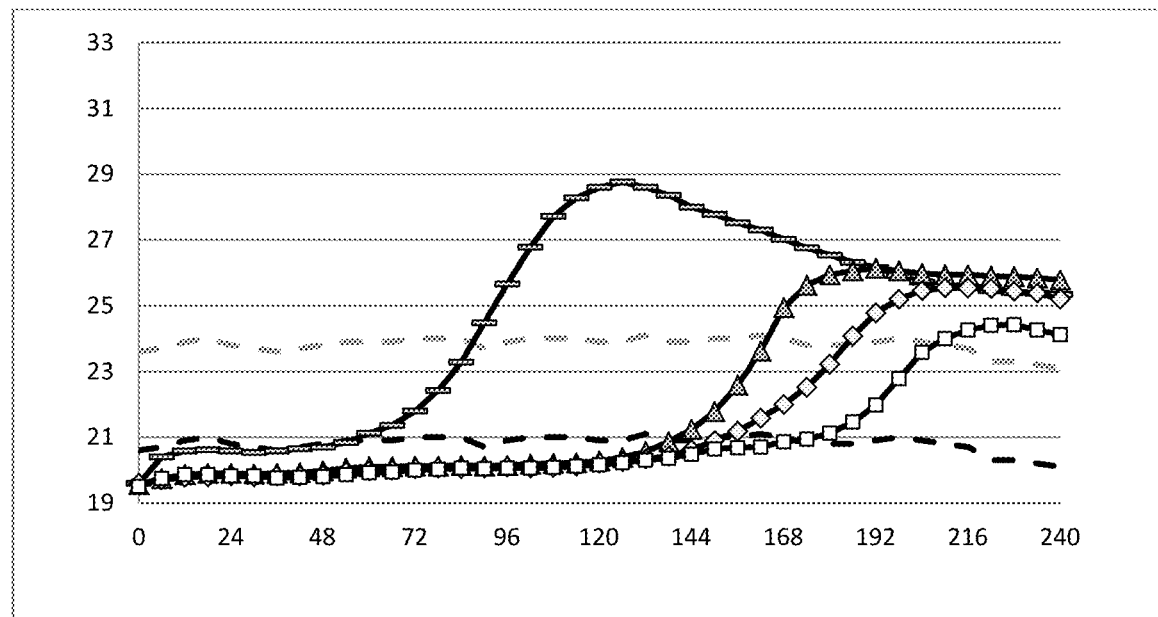

As can be seen in FIG. 8 aerobic exposure of 10 days resulted in a temperature rise of the not inoculated control silage to greater than 3° C. above the ambient temperature after 91 hours, while Composition 7 rose to greater than 3° C. above the ambient temperature after 169 hours. Composition 4 rose to greater than 3° C. after 191 hours and Composition 2 reached the same increase after 214 hours. After 240 hours of aerobic exposure, the pH of the control was as high as 7.93, while the pH of Composition 7 was 5.41, the pH of Composition 4 was 5.35, and the pH of Composition 2 was the lowest at 4.93.

TABLE 6

Effect of various compositions on the fermentation variables and microbial composition of ensiled red clover: timothy: fescue

| Treatment | Control | Composition 2 (percentage) | Composition 4 (percentage) | Composition 7 (percentage) |
|---|---|---|---|---|
| L. buchneri DSM 22501 | | 100 | 50 | 50 |
| L. lactis DSM 11037 | | | 50 | |
| E. faecium DSM 22502 | | | | 30 |
| L. plantarum DSM 16568 | | | | 20 |
| Measurement after 3 days of anaerobic fermentation | | | | |
| pH after 3 days | 4.75$^a$ | 4.39$^b$ | 4.40$^b$ | 4.34$^c$ |
| Measurement after 90 days of anaerobic fermentation | | | | |
| pH after 90 days | 4.38$^a$ | 4.20$^b$ | 4.17$^b$ | 4.12$^c$ |
| DM, %/kg desiled† | 30.49$^a$ | 31.19$^b$ | 31.45$^b$ | 31.64$^c$ |
| DM loss, %/kg | 7.90$^a$ | 6.20$^b$ | 4.94$^c$ | 4.23$^c$ |
| N—NH3 fraction, %/kg total N | 5.38$^a$ | 4.05$^b$ | 3.79$^b$ | 3.57$^c$ |
| Lactic acid, %/kg DM | 4.55$^a$ | 6.28$^c$ | 5.34$^b$ | 5.89$^c$ |
| Acetic acid, %/kg DM | 2.42$^a$ | 2.38$^b$ | 3.59$^b$ | 2.01$^c$ |
| Butyric acid, %/kg DM | 0.24$^a$ | 0.01$^b$ | 0.02$^b$ | 0.01$^b$ |
| Propionic acid, %/kg DM | 0.02$^a$ | 0.02$^c$ | 0.03$^a$ | 0.02$^a$ |
| Alcohols, %/kg DM | 0.94$^a$ | 0.71$^c$ | 0.82$^b$ | 0.69$^c$ |
| Yeast (log CFU/g) | 3.21$^a$ | 1.00$^b$ | 1.16$^b$ | 1.65$^c$ |
| Moulds (log CFU/g) | 3.03$^a$ | 1.00$^b$ | 1.32$^c$ | 1.34$^c$ |
| Measurement after 10 days of aerobic exposure | | | | |
| pH after aerobic stability test | 7.93$^a$ | 4.93$^b$ | 5.35$^c$ | 5.41$^c$ |
| Aerobic stability, hours | 91.20$^a$ | 213.60$^b$ | 190.8$^c$ | 169.20$^c$ |

Different letters in a row show statistically significant difference (P < 0.05)
There was no effluent in the silos upon opening
†Dry matter corrected for volatiles Mino-Silo 6a—Maize Harvest 2014, US For mini-silo 6a maize was harvested in Delaware, USA, at roughly 35% whole plant DM content. Compositions 4 and 7 were dissolved in de-ionized water and applied to five 20 kg piles of freshly chopped corn forage per treatment to obtain true replicates. Forage from each pile were ensiled in 7.6 L bucket silos and sealed with plastic lids with O-ring seals.

A total of 5 samples at day 0 (fresh material) and 5 buckets per treatment for each fermentation interval (days 2, 7, and 14) were prepared. Buckets were packed with about 6 kg of fresh forage to achieve a final packing density between 0.208-0.266 kg of DM/L. Buckets were stored at (22±1° C.) and opened after 2, 7, and 14 days of ensiling.

For the determination of aerobic stability, 2 kg of a representative sample from each silo was entered into a clean bucket (without packing) and a data logger placed in the geometric center of the forage mass. The loggers were set to record temperatures every 10 minutes and averaged by hour. Buckets were covered with cheesecloth over the top to prevent excessive drying and allowed to incubate in a room at 22±1° C. Ambient temperature in the room was measured and recorded simultaneously. Aerobic stability was defined as the length of time before the silage mass increased 3° C. above a stable baseline after exposure to air.

Results of Mino-Silo 6a

Figure 10:
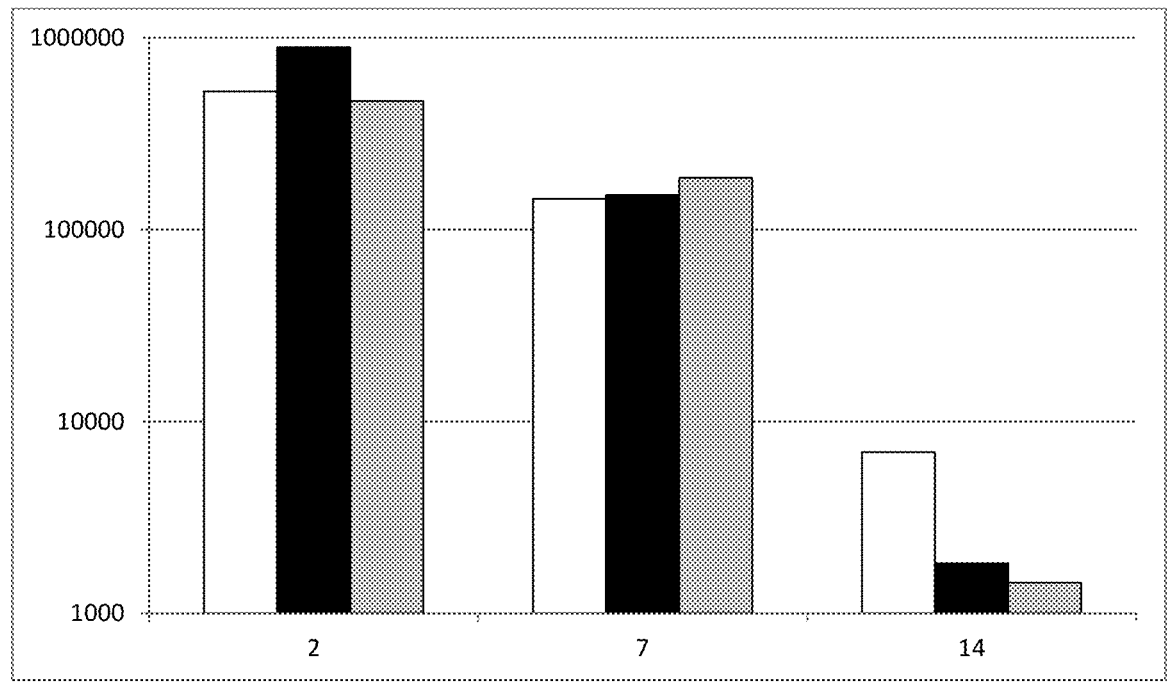
Figure 11:
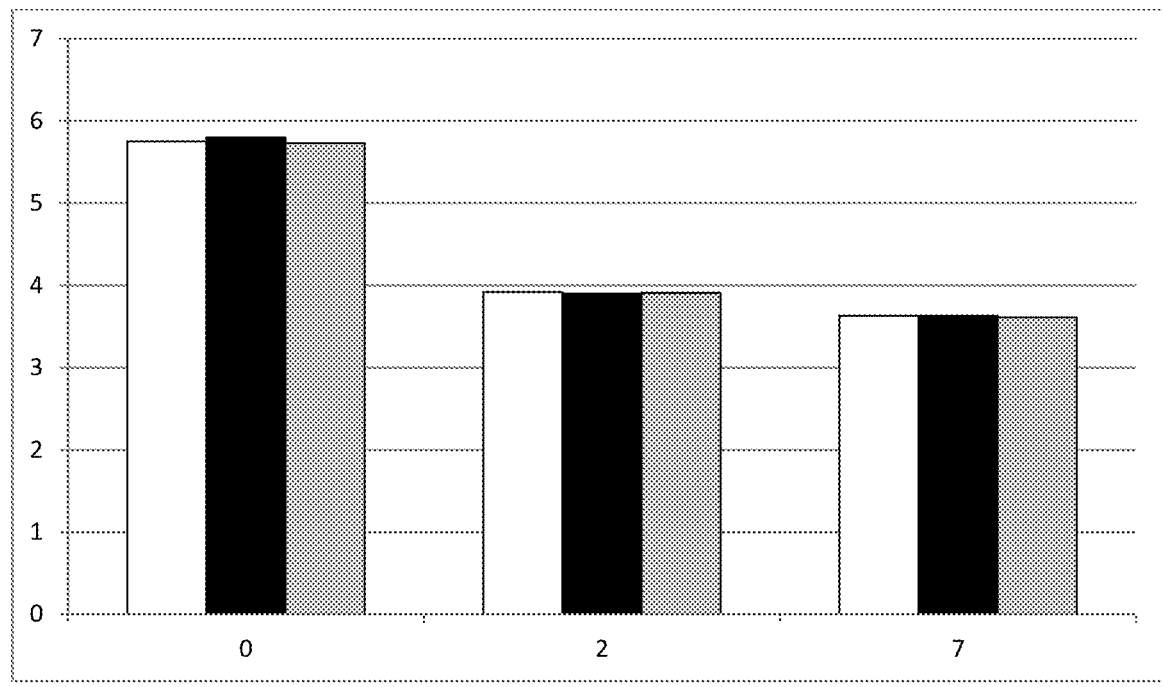

Results for mini-silo 6a are shown in FIGS. 10 and 11 and in table 7a.

TABLE 7a

Effect of various compositions on pH and yeast count at opening after various periods of fermentation and on aerobic stability over a period of 7 days of aerobic challenge

| Day 0 | Control | Composition 4 | Composition 7 |
|---|---|---|---|
| pH | 5.75 | 5.73 | 5.80 |
| At opening after 2 days of fermentation | | | |
| pH | 3.92 | 3.91 | 3.90 |
| Yeasts, cfu/g | 524,807 | 467,735 | 891,251 |
| At opening after 7 days of fermentation | | | |
| pH | 3.62 | 3.62 | 3.64 |
| Yeasts, cfu/g | 144,543 | 186,208 | 151,356 |
| After 7 days of fermentation and 7 days of aerobic challenge | | | |
| Aerobic Stability, h | 41 | 44 | 41 |
| At opening after 14 days of fermentation | | | |
| pH | 3.63 | 3.61 | 3.63 |
| Yeasts, cfu/g | 6,918 | 1,445 | 1,819 |
| After 14 days of fermentation and 7 days of aerobic challenge | | | |
| Aerobic Stability, h | 57 | 66 | 63 |

Mino-Silo 6b—Maize Harvest 2014, Lithuania

For mini-silo 6b maize was harvested in Lithuania, at roughly 35% whole plant DM content. Composition 4 was dissolved in de-ionized water and applied at 150,000 cfu/g forage to a pile of freshly chopped corn forage to obtain true replicates. Forage from this pile as well as a pile of untreated control were ensiled in 3 L glass jars sealed with O-rings.

A total of 5 samples at day 0 (fresh material) and 5 glass jars per treatment for each fermentation interval (days 2, 4, and 8) was prepared. Jars were packed with about 1 kg of fresh forage to achieve a final packing density between 0.208-0.266 kg of DM/L. Glass jars were stored at (20±1° C.) and opened after 2, 4, and 8 days of anaerobic fermentation.

Aerobic Stability

Figure 9A:
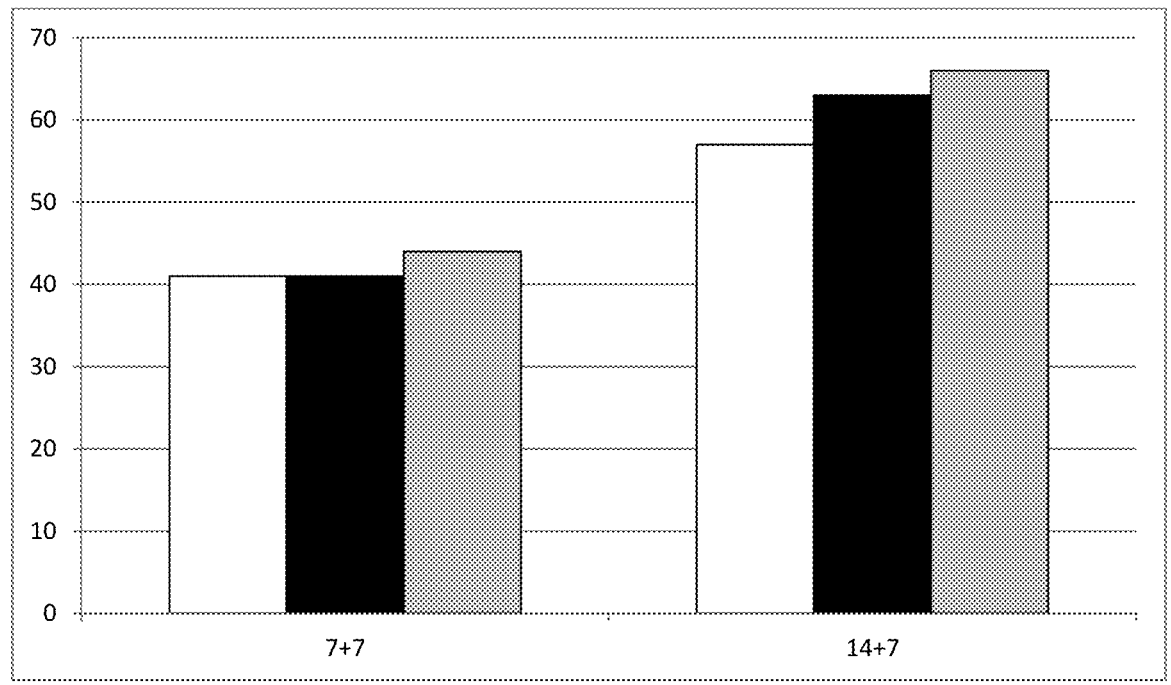

Aerobic stability was determined by monitoring the temperature increase in silages stored in insulated PVC-tubes (1300 ml) at 20±1° C. ambient temperature (room temperature documented during experiment). (FIG. 9a)

Figure 9B:
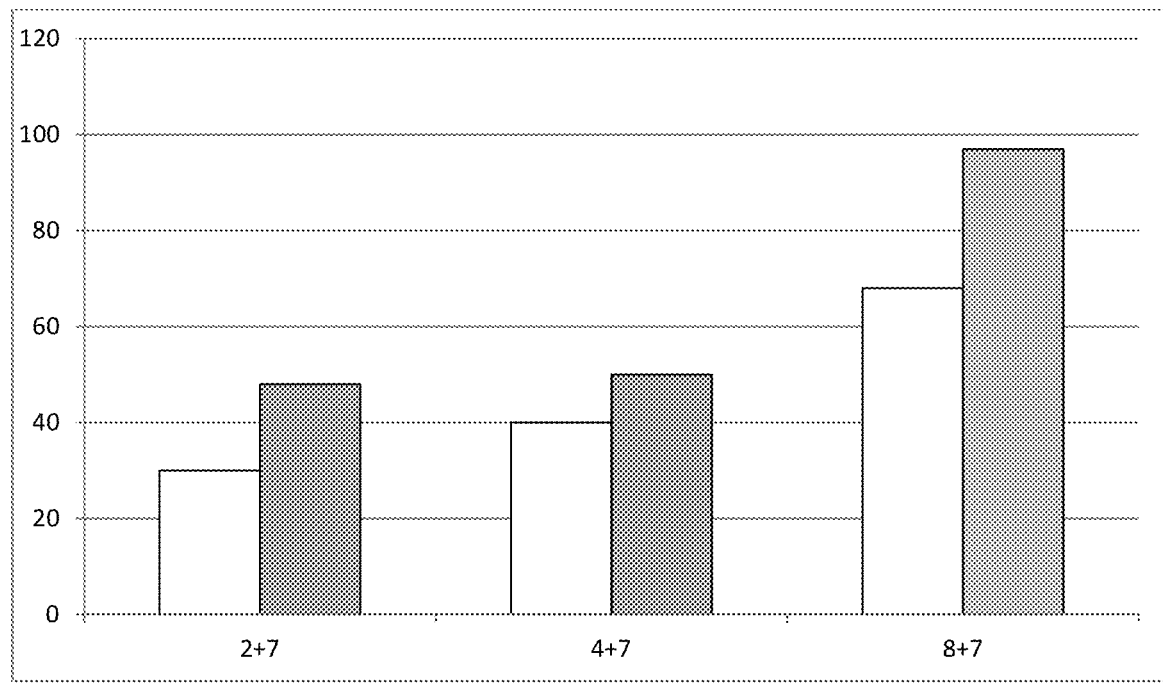

Aerobic deterioration was denoted by hours until silage temperature reached 3° C. above ambient temperature (Table 7b and FIG. 9b).

Results of Mini-Silo 6b

TABLE 7b

| Effect of composition 4 on aerobic stability | | |
|---|---|---|
| | Control | Composition 4 |
| 2 days of anaerobic fermentation and 7 days of aerobic challenge | | |
| Aerobic Stability, h | 30 | 48 |
| 4 days of anaerobic fermentation and 7 days of aerobic challenge | | |
| Aerobic Stability, h | 40 | 50 |
| 8 days of anaerobic fermentation and 7 days of aerobic challenge | | |
| Aerobic Stability, h | 68 | 97 |

Increasing the time of anaerobic fermentation increased the stability of both the control silage and the maize silage inoculated with composition 4. It is noteworthy, however, that inoculation with Composition 4 was able to keep the maize silage stable for 18 hours more than the control after only two days of anaerobic fermentation, and that the difference between control and Composition 4 continues to be considerable (10 and 29 hours, respectively) when fermenting for 4 days or 8 days before aerobic challenge.

Mino-Silos 7a, 7b, and 7c—Maize Harvest 2014, Denmark

Figure 12:
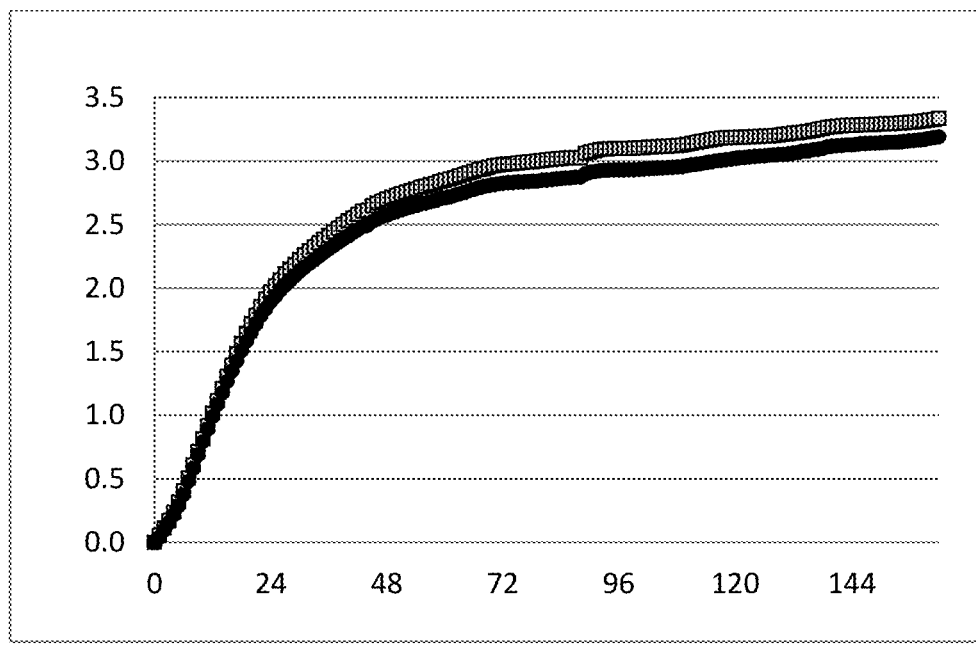
Figures 13, 14:
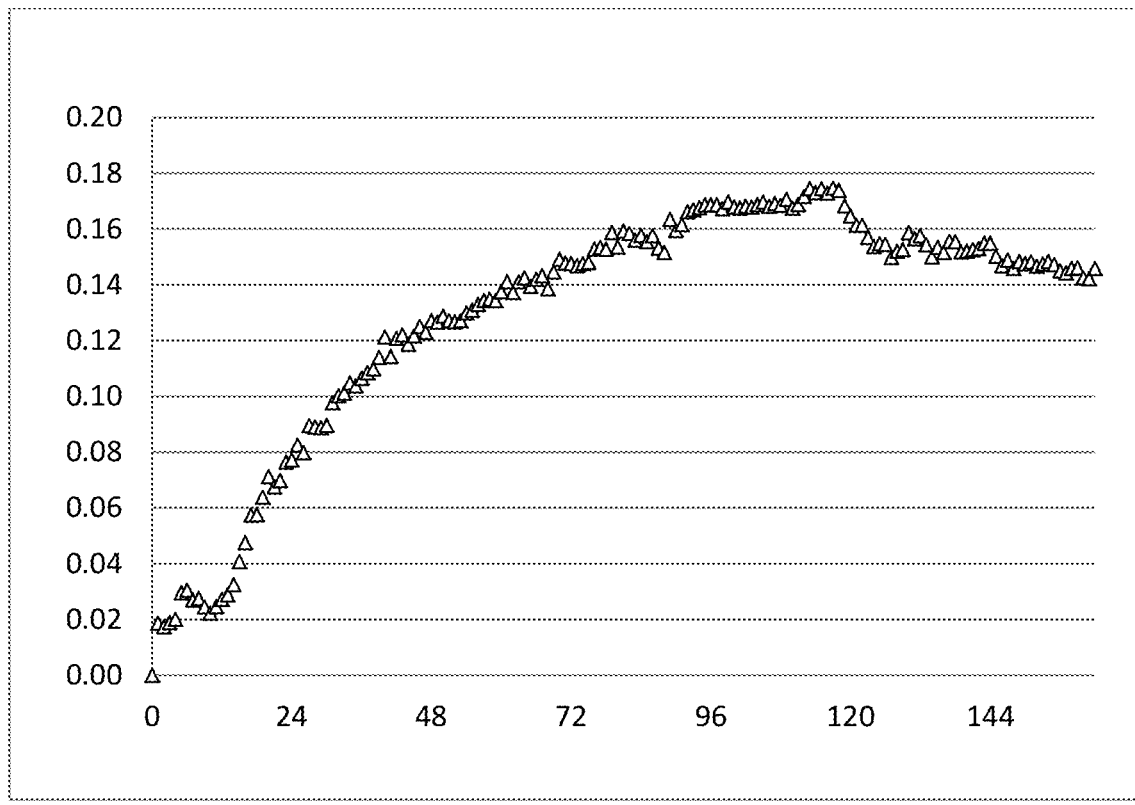

For mini-silo 7a fresh harvested maize (28.6% DM) was collected from a farm in Northern Zealand, Denmark, and transported to the laboratory straightaway. The maize was used to test the effect of Composition 4 versus control using 1.8-L glass jars with automatic gas-release vents (www.ANKOM.com). The glass jars were filled with an average of 746 g of newly harvested maize which was either inoculated with 150,000 CFU/g of Composition 4 (n=5) or inoculated with same amount of tap water (n=5) as a control. The jars were kept at room temperature of approximately 21° C. The gas production was measured in 10-minutes interval automatically and gas was released also automatically when reaching 1.5 psi. The accumulated gas was converted to ml per g fresh forage (Volume=P (pressure in psi)×C (volume of jar)/average atmospheric pressure recorded from 0 to 162 hours×total sample of the feed (fresh weight)). The gas production was measured for 162 hours (FIG. 12) and the difference between the control and the maize treated with Composition 4 is shown in FIG. 13.

For mini-silo 7b, one kg of the same maize as in mini-silo 7a was used the same day and vacuum-packed by removing 90% of the air and sealed. Five bags per treatment were used with either no inoculation (white bar), Composition 4 (150,000 CFU/g maize, grey bar) or Composition 7 (150,000 CFU/g maize, dotted bar). After 162 hours the bags were opened, gas released and weight loss measured (FIG. 14).

Figure 15:
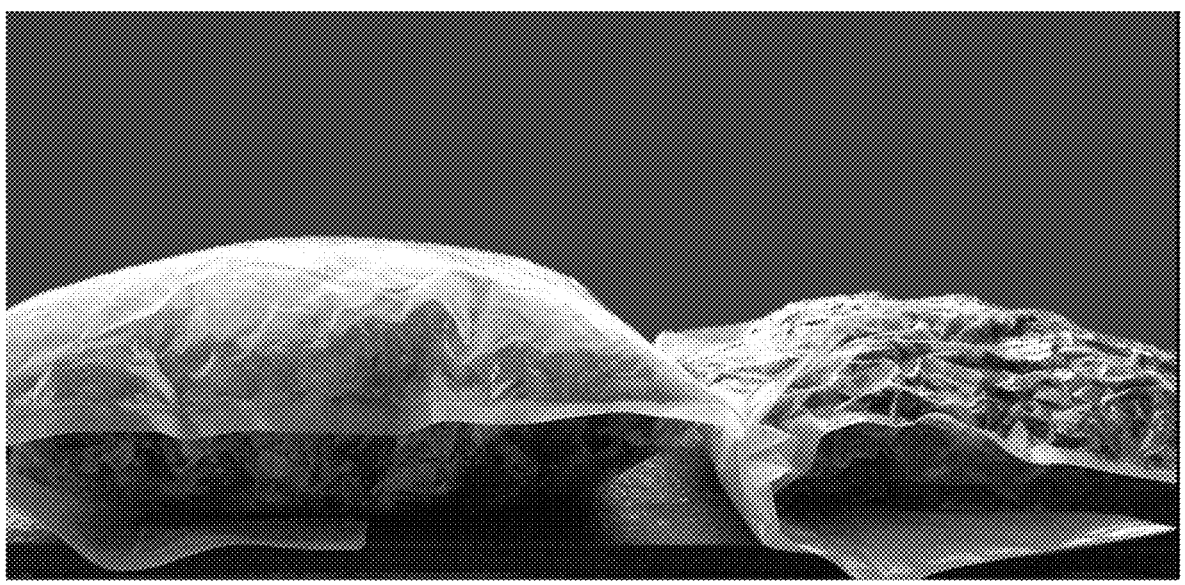

For mini-silo c, the same maize as in mini-silo 7a was used after having being stored in the freezer at −18° C. After this, forage was thawed and one kg samples were vacuum-packed by removing 90% of the air and sealed. Vacuum-packed bags of forage with either no inoculant or Composition 4 (150,000 CFU/g maize) were left outside at ambient temperature to simulate "true outdoor conditions" and to ascertain the gas production after 6 days of fermentation. (FIG. 15).

Results of Mini-Silo 7a, 7b, and 7c

The very early (first 48 hours) gas production in silage is associated with epiphytic aerobic microorganisms from the family of Enterobacteriaceace (e.g., *E. coli, Salmonella, Klebsiella* etc.). The gas production is related to nutrient loss from the silage. Inoculating maize with Composition 4 resulted in less gas production compared to not inoculated maize (FIG. 12). The difference in gas production increased from 10 hours to 116 hours, where it peaked with a difference of 0.17 ml of gas per g maize (FIG. 13).

In the vacuum-packed maize the nutrient loss could be assessed by weighing the bags. Composition 4 had less weight loss compared to control, but also compared to Composition 7 (FIG. 14).

Under real conditions, many farmers experience that their silage bunkers tend to "inflate" after sealing. As illustrated in FIG. 15, the difference in gas development between non-inoculated (left hand side) and inoculated with Composition 4 (right hand side) could easily be detected visually.

Discussion

Acetic acid produced by *L. buchneri* is known to be an important acid to combat growth of aerobic spoilage strains at feedout, where the silage is exposed to oxygen. However, the growth of *L. buchneri* has a long lag time and the pH reduction using *L. buchneri* is very slow. To address this, *L. buchneri* has been combined with a high lactic acid producing bacterial species, such as *L. plantarum*. However, the combination of high lactic acid producing strains can counteract the efficiency of *L. buchneri* on aerobic stability. This phenomenon is shown in Mini-silo 2, where Composition 5, containing 70% *L. buchneri* DSM 22501 and 10% *L. plantarum* DSM 16568, 20% *L. lactis* DSM 11037, resulted in a much less stable silage compared to Composition 4, which contained only a low lactic acid producing strain (50% *L. lactis* DSM 11037) combined with *L. buchneri* DSM 22501 (50%). (FIG. 4)

Composition 4 achieved a fast and high ending pH level compared to other combinations with high lactic acid producing species. While not wanting to be bound by any theory, it is believed that in Composition 4, *L. buchneri* DSM 22501 was still able to continue growing and/or be metabolic active, as indicated by the high acetic acid level (FIG. 1c). The high acetic acid/lactic acid proportion of Composition 4 also is seed in mini-silo 1 (FIG. 3). Additionally, the high acetic acid/lactic acid ratio at an early stage of anaerobic fermentation apparently had a positive effect on the aerobic stability in mini-silo 3, which was opened after only a short period (2 weeks) of anaerobic fermentation.

These results also show that the DM loss, an important forage quality parameter, was as low for Composition 4 as for products containing high lactic acid producing strains (see mini-silo 4 and mini-silo 5), while Composition 4 also achieved a high acetic acid production. The high acetic acid level results in a very stable silage (FIGS. 4, 5, 6 and 7), which in all three cases with mini-silos (Example 2) was superior compared to other compositions with *L. buchneri*

DSM 22501 (Compositions 5 and 7) where *L. plantarum* DSM 16568, a high lactic acid producing strain, was included.

As shown in FIG. 9a Composition 4 increased aerobic stability as compared to the untreated control following a short fermentation period of 7 days or 14 days. In addition, and very surprisingly, Composition 4 also demonstrated better aerobic stability than the positive control (Composition 7) at both timings.

As illustrated in FIG. 9b Composition 4 increased aerobic stability as compared to the untreated control after 8 days of fermentation followed by 7 days of aerobic challenge. In addition, and very surprisingly, Composition 4 increased aerobic stability as compared to the untreated control even following a very short fermentation period of only 2 days or 4 days As illustrated in FIG. 10 the generally recognized pattern of reduction in yeast counts as a function of increased fermentation time was observed. However, surprisingly the reduction in yeast counts was greater using Composition 4 both versus the negative and positive control (Composition 7) following both 2 and 14 days of fermentation.

Surprisingly, as illustrated in FIG. 11, pH level when using Composition 4 was reduced to the same level as the positive control (Composition 7), despite the lack of *Lactobacillus plantarum* in Composition 4.

These experiments therefor show that a silage inoculant consisting essentially of the facultative heterofermentative *L. buchneri* and only homofermentative strains achieve a good forage quality with improved aerobic stability even for silages opened after only a short period of anaerobic fermentation.

REFERENCES

Jatkauskas, J. and V. Vrotniakiene, "*Evaluation of fermentation parameters, microbiological composition and aerobic stability of grass and whole crop maize silages treated with microbial inoculants.*" Zemdirbyste-Agriculture., 2013, Vol. 100, No. 2, pp. 143-150

Jatkauskas, J. et al. (2013), *The effects of three silage inoculants on aerobic stability in grass, clover-grass, lucerne and maize silages*, Agricultural and Food Science, 2013, 22, 137-144

Vandamme, B. et al, *Polyphasic Taxonomy, a Consensus Approach to Bacterial Systematics*, Microbiological Reviews, 1996, Vol. 60, No. 2, 407-438

The invention claimed is:

1. A method for producing a fermented feed product, said method comprising inoculating a plant material with a silage inoculant consisting essentially of:
   (a) at least one obligatory heterofermentative lactic acid bacterial strain selected from at least one of *Lactobacillus brevis, Lactobacillus buchneri, Lactobacillus fermentum*, and *Lactobacillus reuteri*, and
   (b) at least one homofermentative bacterial strain which reduces pH fast without producing an excess amount of lactic acid selected from at least one of an *Enterococcus faecium* strain and a *Lactococcus lactis* strain,
   wherein the silage inoculant does not include *Lactobacillus plantarum*.

2. The method of claim 1, wherein the at least one obligatory heterofermentative lactic acid bacterial strain comprises a *Lactobacillus buchneri* strain.

3. The method of claim 2, wherein the *Lactobacillus buchneri* strain is the *Lactobacillus buchneri* strain deposited with the Deutsche Sammlung von Mikroorganismen und Zellkulturen GmbH (DSMZ) as DSM 22501.

4. The method of claim 1, wherein the at least one homofermentative bacterial strain comprises an *Enterococcus faecium* strain.

5. The method of claim 1, wherein the at least one homofermentative bacterial strain comprises a *Lactococcus lactis* strain.

6. The method of claim 5, wherein the *Lactococcus lactis* strain is the *Lactococcus lactis* strain deposited with the DSMZ as DSM 11037.

7. The method of claim 1, wherein the silage inoculant consists essentially of a *Lactobacillus buchneri* strain and a *Lactococcus lactis* strain.

8. A method according to claim 1 wherein the plant material is inoculated with the silage inoculant and incubated for a period of up to 7 days.

9. A method according to claim 1 wherein the plant material is inoculated with the silage inoculant and incubated for a period of up to 14 days.

10. A method according to claim 1 wherein the plant material is inoculated with the silage inoculant and incubated for a period of up to 28 days.

11. A method according to claim 1 wherein the plant material is inoculated with the silage inoculant and incubated for a period of at least 90 days.

12. A method according to claim 1, wherein the homofermentative strain does not produce nisin.

13. A method according to claim 1, wherein the homofermentative strain inhibits growth of the obligatory heterofermentative strain by less than 5 mm when the homofermentative strain and the obligatory heterofermentative strain are streaked onto the same Mann-Rogosa-Sharpe (MRS) agar plate and incubated overnight under anaerobic conditions at 37° C.

14. A method according to claim 1, wherein the homofermentative strain produces not more than 3 mg/ml lactic acid after 24 hours inoculation at 150,000 CFU/ml into 10 ml sterile silage medium contained in a tube held in a water bath at 30° C., wherein the sterile silage medium is produced by mixing 5 g/L yeast extract, 5 g/L peptone soya neutralized, 0.8 g/L soluble starch, 0.08 g/L manganese(II) sulfate dihydrate, 0.037 g/L succinic acid, 0.069 g/L citric acid monohydrate, and 0.14 L-malic acid in 900 mL water until dissolved, adjusting the pH to 6.3, autoclaving in bottles at 121° C. for 15 minutes, and then adding 100 ml of sterile filtered sugar solution containing 56 g/L D(−) fructose, 32 g/L D(+) glucose monohydrate, 20 g/L D(+) xylose, 20 g/L L(+) arabinose, and 32 g/L sucrose.

15. The method of claim 1, wherein the silage inoculant consists essentially of a *Lactobacillus buchneri* strain, a *Lactococcus lactis* strain and an *Enterococcus faecium* strain.

16. The method of claim 1, wherein the at least one obligatory heterofermentative lactic acid bacterial strain comprises a *Lactobacillus brevis* strain.

17. The method of claim 1, wherein the silage inoculant consists essentially of a *Lactobacillus brevis* strain and an *Enterococcus faecium* strain.

18. The method of claim 1, wherein the silage inoculant consists essentially of a *Lactobacillus brevis* strain and a *Lactococcus lactis* strain.

19. The method of claim 1, wherein the silage inoculant consists essentially of a *Lactobacillus brevis* strain, a *Lactococcus lactis* strain, and an *Enterococcus faecium* strain.

20. The method of claim 1, wherein the at least one obligatory heterofermentative lactic acid bacterial strain comprises a *Lactobacillus fermentum* strain.

21. The method of claim 1, wherein the silage inoculant consists essentially of a *Lactobacillus fermentum* strain and an *Enterococcus faecium* strain.

22. The method of claim 1, wherein the silage inoculant consists essentially of a *Lactobacillus fermentum* strain and a *Lactococcus lactis* strain.

23. The method of claim 1, wherein the silage inoculant consists essentially of a *Lactobacillus fermentum* strain, a *Lactococcus lactis* strain, and an *Enterococcus faecium* strain.

24. The method of claim 1, wherein the at least one obligatory heterofermentative lactic acid bacterial strain comprises a *Lactobacillus reuteri* strain.

25. The method of claim 1, wherein the silage inoculant consists essentially of a *Lactobacillus reuteri* strain and an *Enterococcus faecium* strain.

26. The method of claim 1, wherein the silage inoculant consists essentially of a *Lactobacillus reuteri* strain and a *Lactococcus lactis* strain.

27. The method of claim 1, wherein the silage inoculant consists essentially of a *Lactobacillus reuteri* strain, a *Lactococcus lactis* strain, and an *Enterococcus faecium* strain.

* * * * *